(12) United States Patent
Grigg

(10) Patent No.: US 8,373,297 B2
(45) Date of Patent: Feb. 12, 2013

(54) WIND TURBINE GENERATOR AND MOTOR

(76) Inventor: Charles Grigg, Westport, CA (US)

( * ) Notice: Subject to any disclaimer, the term of this patent is extended or adjusted under 35 U.S.C. 154(b) by 415 days.

(21) Appl. No.: 12/657,136

(22) Filed: Jan. 13, 2010

(65) Prior Publication Data
US 2010/0181777 A1  Jul. 22, 2010

Related U.S. Application Data

(60) Provisional application No. 61/205,359, filed on Jan. 16, 2009.

(51) Int. Cl.
*F03B 13/00* (2006.01)
*H02P 9/04* (2006.01)

(52) U.S. Cl. .................. 290/54; 290/43; 416/98

(58) Field of Classification Search ............... 290/54, 290/55, 43, 44; 416/98, 117
See application file for complete search history.

(56) References Cited

U.S. PATENT DOCUMENTS

| 325,366 A | 9/1885 | Simpson |
|---|---|---|
| 345,797 A | 8/1886 | Aylsworth |
| 1,111,350 A | 9/1914 | Bayley |
| 2,099,617 A | 4/1935 | Nelson |
| 4,093,035 A | 6/1978 | Fletcher |
| 4,619,583 A | 10/1986 | Wikstrom |
| 4,649,284 A | 3/1987 | Hsech-Pen |
| 4,818,180 A | 4/1989 | Liu |
| 5,083,902 A | 1/1992 | Rhodes |
| 5,844,323 A | 12/1998 | Hung |
| 6,537,018 B2 | 3/2003 | Streetman |
| 6,619,921 B1 | 9/2003 | Lindhorn |
| 8,087,894 B2 * | 1/2012 | Brooks ............... 416/117 |
| 2002/0187038 A1 * | 12/2002 | Streetman ............ 415/3.1 |
| 2004/0164561 A1 | 8/2004 | Nagawa et al. |
| 2005/0082838 A1 | 4/2005 | Collins |
| 2008/0181777 A1 * | 7/2008 | Bailey ............... 416/117 |
| 2008/0304965 A1 | 12/2008 | Syrovy |
| 2011/0091322 A1 * | 4/2011 | Deeley .................. 416/98 |

FOREIGN PATENT DOCUMENTS

| GB | 2202592 A | 9/1988 |
|---|---|---|
| JP | 56050270 A | 5/1981 |
| JP | 57046073 A | 3/1982 |

* cited by examiner

*Primary Examiner* — Hae Moon Hyeon
(74) *Attorney, Agent, or Firm* — Howard Cohen

(57) ABSTRACT

A wind turbine includes a quartet of pivot shafts in paired parallel relationship and transversely mounted on a central drive shaft, each pivot shaft supporting a pair of wings at opposed ends thereof, the wings offset by 90°. Each pivot shaft rotates cyclically through 90° to move each wing from a wind-engaging orientation (drive position) in which the wing presents a flat surface approximately transverse to the incident wind, to a minimum drag position (glide position). The wings of each pair of pivot shafts open into the drive position at the same time and rotational angle of the turbine. A backstop at the site of each drive position transfers force from each wing to the central drive shaft.

24 Claims, 21 Drawing Sheets

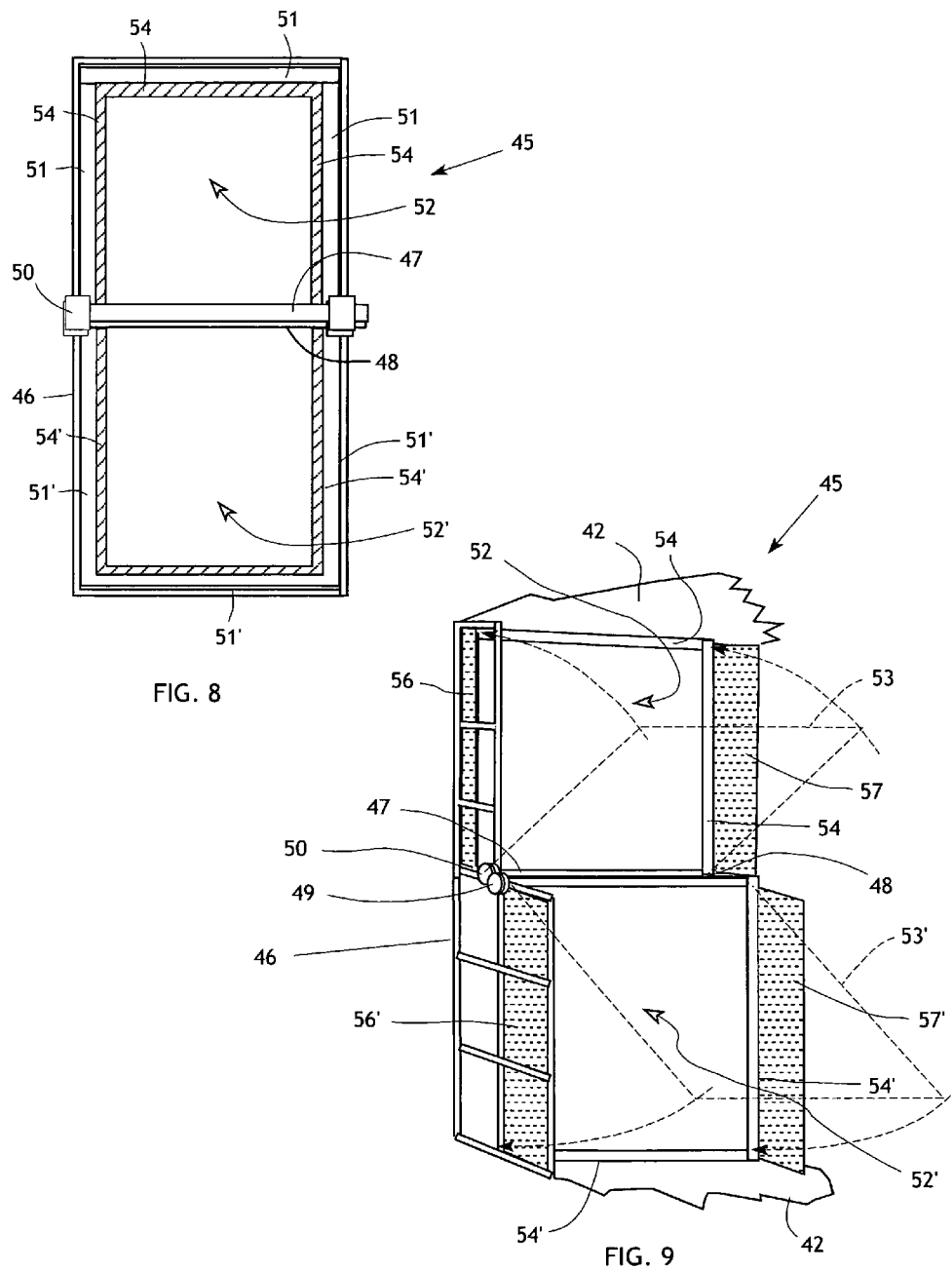

WIND TURBINE GENERATOR AND MOTOR

CROSS-REFERENCE TO RELATED APPLICATIONS

This application claims the priority date benefit of U.S. Provisional Application No. 61/205,359, filed Jan. 16, 2009.

FEDERALLY SPONSORED RESEARCH

Not applicable.

SEQUENCE LISTING, ETC ON CD

Not applicable.

BACKGROUND OF THE INVENTION

1. Field of the Invention

This invention relates to wind turbines and, more particularly, to wind turbine designs that maximize the frontal contact area of the turbine wings with the wind incident thereon.

2. Description of Related Art

The recent renewed interest in renewable energy sources has highlighted wind energy and the use of wind turbines to generate electrical power by harnessing the energy of wind currents. Indeed, many very large turbines have been installed or are being built around the world, typically employing towers 50 meters or more in height and turbine blades that may exceed 30 meters in length. These installations are successful in generating large amounts of electrical power, and because of their relatively slow rotational speed they tend to avoid negative impacts on local bird populations. However, it is apparent that the frontal contact area of the turbine blades of one of these typical turbines is a very small fraction of the virtual disk surface swept by the blades in a complete rotation, which leads to the conclusion that a great amount of wind energy is passing through the swept area of the turbine without contacting a blade or contributing any useful work toward power generation. Thus these turbines are necessarily low efficiency devices, when efficiency is calculated at a ratio of generated power to the wind power passing through the turbine's swept area.

In general, the long length of the blades tends to limit their width because of considerations of increased mass rotating, and increased lateral wind loads therefrom, at the top of the tower. Furthermore, the typical wind turbine blades rely on aerodynamic lift to generate rotational force, and the lift characteristic is often not directly related to blade width.

There are known in the prior art various attempts to devise windmills that employ flat blades to confront the flowing fluid transversely and receive the full force of the incident fluid, whether water or air. For example, U.S. Pat. No. 1,111,350 to Bayley describes a water current motor that has a central vertical shaft, and a pair of transverse pivot shafts extend through the central vertical shaft to support a pair of paddle-like blades, one at each end of each pivot shaft. The blades extend perpendicularly to their respective shafts, and the blades on each shaft are offset 90° each from the other about the axis of the pivot shaft. As one blade rotates into the wind it is urged thereby to rotate downwardly to a vertical position to catch the wind fully, while the blade at the other end of the shaft rotates into a feathered position. A cylindrical frame is secured about the central vertical shaft and is connected by rigid links thereto, and also connected to the outer ends of the pivot shafts for their support.

This device does not maximize the amount of power extracted from incident winds or fluid flows, and the torque it generates is not counterbalanced by any mechanical force other than the expedient of anchoring it to fixed points. Moreover, the pivot shafts extend diametrically through the central vertical shaft, and this factor prevents the use of a hollow tubular central shaft, a disadvantage that will be further explored in the following description of the present invention. In addition, the pivot shafts are supported at an upper quarter and medial portion of the central vertical shaft, causing the fluid force developed by the blades to be applied to the central and upper quarter portions of the vertical shaft. These forces are unbalanced and creates unbalanced intake and discharge flows.

BRIEF SUMMARY OF THE INVENTION

The present invention generally comprises a wind turbine design that maximizes the frontal contact area of the turbine wings with the incident wind stream, so that a large fraction of the energy of the incident wind is converted to useful work. The unique construction of the wind turbine thus yields a more efficient wind turbine that is adaptable to many uses, as will be described below. Note that although this initial description relates to wind-driven turbines, it applies equally to any fluid flow, such as river currents, tidal flow, hydroelectric power generation, and the like.

The invention introduces the use of turbine wings mounted on pivot shafts that are mounted in paired relationship and transversely mounted on a central drive shaft. The pivot shafts all rotate about the central drive shaft. Each pivot shaft enables its respective wings to rotate cyclically from a wind-engaging orientation (drive position) in which the wing presents a flat surface approximately transverse to the incident wind, to a minimum drag position (glide position) that enables the wing to rotate around the central drive shaft with minimum energy loss until it returns "into the wind" and repeats the cycle and rotates the pivot shaft and moves into drive position once again.

Also, each pivot shaft supports a pair of wings, each wing secured to a respective end of the pivot shaft. Moreover, each wing is oriented so that the axis of the pivot shaft lies in the virtual plane that contains the wing. In addition, the two wings of each pair on a shaft are disposed in planes that are offset by approximately 90° about their pivot shaft.

The paired relationships of the pivot shafts cause the wings of one shaft to be vertically adjacent the wings of the other shaft. Assuming the central drive shaft extends vertically, the wings of the upper pivot shaft are disposed so that they rotate cyclically between extending upwardly (vertically) in the drive position, to the neutral glide (feathered) position. The wings of the lower shaft are disposed so that they rotate cyclically between extending downwardly (vertically) in the drive position, to the neutral glide position. Thus the upper and lower shafts cyclically and repeatedly rotate wings into the drive position, the former rotating upwardly and the latter rotating downwardly, so that the entire airflow space is blocked by the wings rotating through the drive position. Thus these wings are fully deployed to be completely and repeatedly impinged on by the incident wind, the force of the wind on the wings in the drive position pushing the pivot shafts to rotate the central drive shaft about its axis. The rotation of the central drive shaft may be used to do useful work, such as electricity generation, pumping, and the like.

The invention also provides a support structure for the central drive shaft, the pivot shafts, and the wings. Each pivot shaft is supported in a journal joined to the central drive shaft, and the preferred embodiment provides two pairs of two pivot shafts, for a total of four pivot shafts and eight wings. A generally cylindrical outer frame or strut structure extends coaxially about the central drive shaft, the frame including end assemblies that support the central drive shaft at both its ends. Each end of each pivot shaft is secured in a bushing or bearing in the cylindrical frame, so that the pivot shaft portion where each wing is attached is supported centrally by the central shaft journal and at its outer end by the bushing in the outer frame.

The cylindrical outer frame further introduces a pair of support frame structures, each frame structure extending generally diametrically through the outer frame, spanning the end assemblies of the cylindrical outer frame and each aligned with a respective pair of pivot shafts. The support frame structures are in mutual orthogonal relationship about the axis of the cylindrical frame. Each support frame includes four box-like backstop fairings, one for each turbine wing at the ends of the pivot shafts that are aligned with the support frame. Each fairing is aligned vertically (parallel to the central drive shaft) and comprised of a rectangular perimeter defined by shallow sidewalls and having a shock absorbing material lining the rectangular perimeter to be impinged upon by the periphery of the respective wing as the wing is urged to rotate into the drive position. The backstops fairings are supported at their outer extents by the cylindrical outer frame and at their inner extents by support struts extending from bearings riding on the pivot shafts. The backstops are significant in that they receive the majority of the wind force from the wings in the drive position, and transfer that force to the outer frame structure, thus unloading many potential stresses from the pivot shafts and their attachments to their wings, while creating the torque that drives the cylindrical outer frame to rotate the central drive shaft. The fairings also form a seal with the turbine wings in the drive position to capture the maximum amount of energy from the incident wind.

The cylindrical outer frame structure may itself be secured within a housing that supports the cylindrical outer frame by a plurality of roller bearings arrayed in two circular arrangement to impinge on the end assemblies of the cylindrical outer frame. This assembly stabilizes the cylindrical outer frame as it rotates.

It is noted that the drive position of the turbine wings coincides with approximately a 90° portion of the angular rotation of the cylindrical outer frame. The outer housing may be configured as a shroud that encloses the non-drive angular portions of the housing, as well as directs the incident wind energy towards the drive position, thus forming a wind intake opening for the assembly. The wind intake may comprise wind deflector panels or surfaces, funnel-like surfaces, or the like.

In a further development of the invention, a pair of wind turbines may be provided, one a mirror image of the other and arranged to rotate in opposite directions. The pair may be disposed in adjacent side-by-side relationship, whereby their wind intake openings are also directly adjacent. The outer housing encloses the pair of turbines and directs wind into the adjacent wind intake openings. The counter-rotating central drive shafts of the two turbines may be mechanically connected to a gear, chain, pulley, or similar mechanism to synchronize and perform useful work. This side-by-side arrangement also permits the torque of one turbine to be neutralized by the torque of the other, so that there is a net zero torque exerted on the housing. In a similar adaptation a pair of wind turbines may be connected end-to-end, with central drive shafts aligned and connected to do useful work. The two turbines counter-rotate, so that the net torque on the assembly is effectively zero.

The housing may be provided with a wind vane structure and supported on a windmill mount that rotates about the horizon, whereby the wind vane will turn the housing to point the wind intake opening(s) into the wind direction and take advantage of incident wind from any bearing.

The wind turbine may be built to a size and conformation such that it is portable on a truck bed and easily relocatable to places where the wind is blowing. Thus seasonal wind changes can be exploited without requiring placement of the wind turbine in a fixed location.

Likewise, the wind turbine may be mounted on a ship to capture wind energy and generate electrical or hydraulic power to be used for propulsion and operating the ship. The ship may be provided with pontoons, or a catamaran hull, to counterbalance the lateral wind force on the turbine.

Although the invention is described above with reference to air flow and wind energy, it may be appreciated that any fluid flow will drive the turbine described herein. Thus there are ample opportunities to exploit water flow, such as river currents, tidal currents, wave action, and dammed water supplies.

A further use of the invention takes advantage of its dynamic symmetry: rotating the central drive shaft causes the turbine wings to carry out their motions as described above, except that in the drive quadrant the wings act to push the air at the intake opening, creating an airstream and thrust. Because the frontal contact of the wings engages a high fraction of the surface intake area it is believed that as a propulsion device this machine by virtue of this efficient use of surface area will retain traction is thin atmospheres better that propeller devices.

BRIEF DESCRIPTION OF THE DRAWING

FIG. 8 is a plan view, and FIG. 9 is a perspective fragmentary view, of a backstop assembly of the invention.

DETAILED DESCRIPTION OF THE INVENTION

Figure 1:
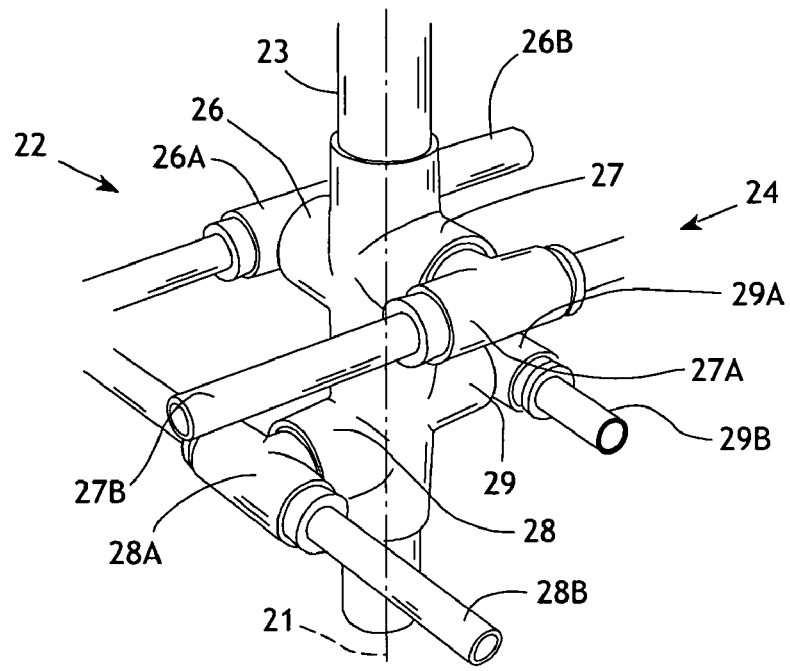
FIG. 1 is an enlarged fragmentary perspective view of the hub portion of the wind turbine of the present invention.

The present invention generally comprises a wind turbine that is designed to maximize the amount of energy extracted from the ambient wind currents. The wind turbine is constructed as a modular cylindrical assembly having an axis 21 about which it rotates when impinged on by wind or any airflow passing thereby. With regard to FIGS. 1-3, a central component of the wind turbine is a central drive shaft assembly 22 extending coaxially with axis 21 and adapted to rotate thereabout. The drive shaft assembly preferably comprises a hollow drive shaft 23 adapted to be connected to perform useful work, as will be described below. The drive shaft 23 is provided with a hub portion 24 comprised of four bosses 26, 27, 28, and 29 extending generally radially from the drive shaft. The bosses 26 and 27 are disposed in diametrically opposed, axially offset relationship, and the bosses 28 and 29 are similarly disposed but angularly offset 90° about the axis 21 from the bosses 26 and 27, as shown clearly in FIGS. 1-3.

Each boss 26-29 supports a respective bearing housing 26A-29A, and each bearing housing supports the medial portion of a respective pivot shaft 26B-29B. Note that the pivot shafts extend transversely to the axis 21, and are in the paired, parallel, offset relationships established by the bearing housings 26A-29A.

Figure 4:
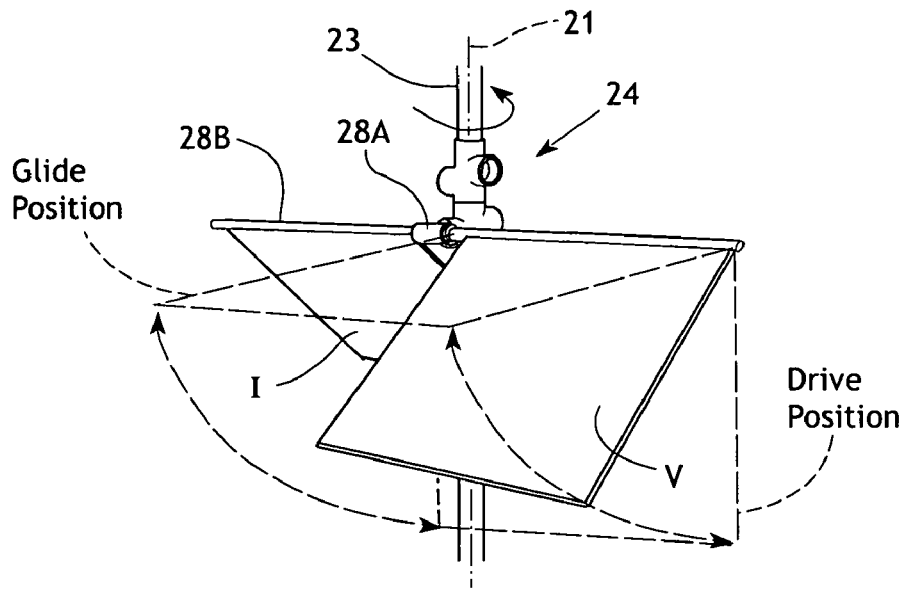
FIGS. 4-7 are a sequence of perspective views of the hub portion and pivot shafts and wings secured thereto.

FIG. 4 illustrates the hub portion 24 and isolates the pivot shaft 28B to simplify explanation. Secured to the opposed ends of shaft 28B is a pair of paddle-like wings I and V, each wing extending radially from the shaft 28B and forming a common plane therewith. The shaft 28B may be longitudinally slotted at each end to secure an inboard edge of the wing I or V, or the wing may be secured by any mechanical means known in the prior art, such as adhesives, solvent or fusion bonding, welding or soldering, swaging or press fitting, or the like. Each wing I and V is comprised of a rectangular panel that is strong, stiff, durable, and lightweight. It is significant to note that the wings I and V are angularly offset about the axis of the pivot shaft 28B by 90°. Because of constraints that will be described below, each wing is limited in its rotational movement between a drive position in which the wing extends downwardly and is aligned parallel with the central drive shaft 23, to a glide position in which the wing is aligned transversely to the central drive shaft, as labeled in FIG. 4. Thus in the view of FIG. 4, the wings cannot rotate upward above horizontal, nor can they rotate downward beyond the 90° limit.

It is also significant to note that when one of the wings I or V is disposed in the drive position, the other wing V or I is disposed in the glide position. Moreover, each wing exerts a rotational moment about the axis of the shaft 28B, and those moments tend to be counteracting. Thus, when the wings are at approximately the 45° orientation, as shown in FIG. 4, the assembly of the shaft 28B and wings I and V is in rotational equilibrium.

It is also significant to note that when one of the wings 31 or 32 is disposed in the drive position, the other wing 32 or 31 is disposed in the glide position. Moreover, each wing exerts a rotational moment about the axis of the shaft 28B, and those moments tend to be counteracting. Thus, when the wings are at approximately the 45° orientation, as shown in FIG. 4, the assembly of the shaft 28B and wings 31 and 32 is in rotational equilibrium.

Figure 5:
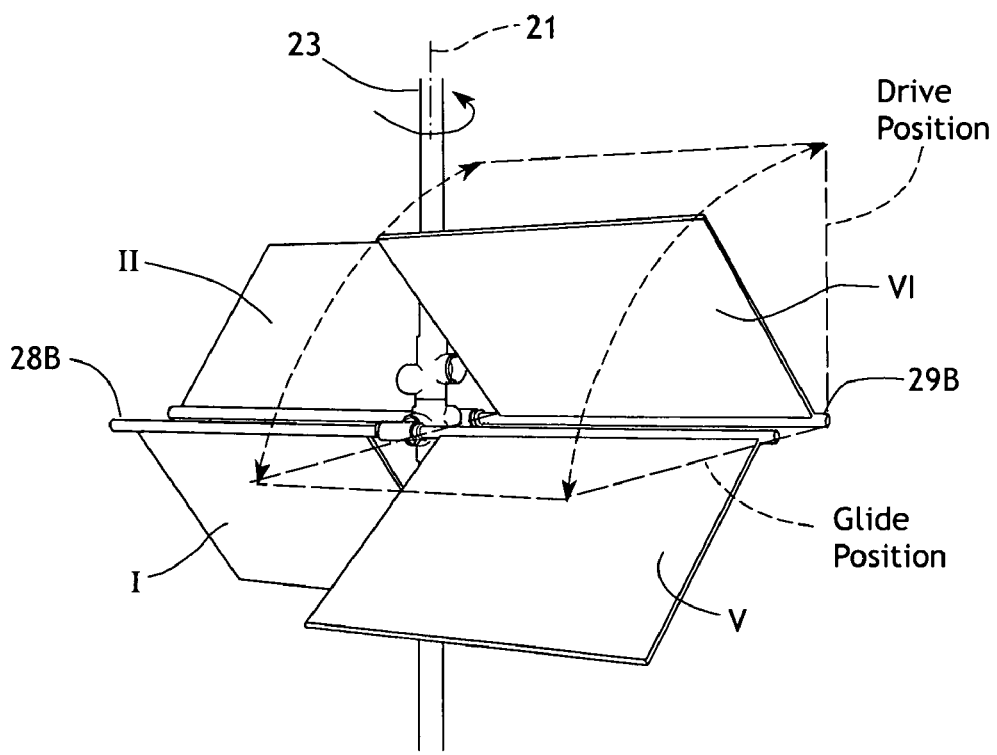

FIG. 5 depicts in isolation the two paired, parallel, longitudinally offset pivot shafts 28B and 29B on the central drive shaft. Mounted on the opposed ends of shaft 29B are a pair of wings II and VI, so that wings V and VI are adjacent and wings I and II are adjacent. The wings II and VI are secured to the shaft 29B in the same manner as describe previously, are formed of similar material, and are also oriented at 90° to each other. Note that the wings II and VI are oriented on shaft 29B so that they rotate between a drive position in which wing II or VI extends upwardly and is aligned parallel to the central axis 21, to a glide or feathered position in which the wing is aligned transversely to the central drive shaft, as labeled in FIG. 5. Thus in the view of FIG. 5, the wings cannot rotate downwardly below horizontal, nor can they rotate upwardly beyond the 90° limit.

Once again, when one of the wings V or VI is disposed in the drive position, the other wing VI or V is disposed in the glide position. Moreover, each wing exerts a rotational moment about the axis of the shaft 29B, and those moments tend to be counteracting. Thus, when the wings are at approximately the 45° orientation, as shown in FIG. 5, the assembly of the shaft 29B and its wings is in rotational equilibrium.

It is significant that the drive positions depicted in FIGS. 4 and 5 are aligned at the same rotational angle of the central drive shaft, and wings V and VI are directly opposed and parallel to the axis 21. In this orientation the wings V and VI are disposed to present a maximum cross-sectional area to the incident wind to extract the greatest energy possible therefrom, as will be explained below. Likewise, the glide positions are aligned at the same rotational angle of the central drive shaft to create the minimum air drag as the wings rotate away from the drive position. This feature enables the wings to rotate around the central drive shaft with minimum energy loss until they return "into the wind" and repeat the cycle and rotate into the drive position once again.

Figure 6:
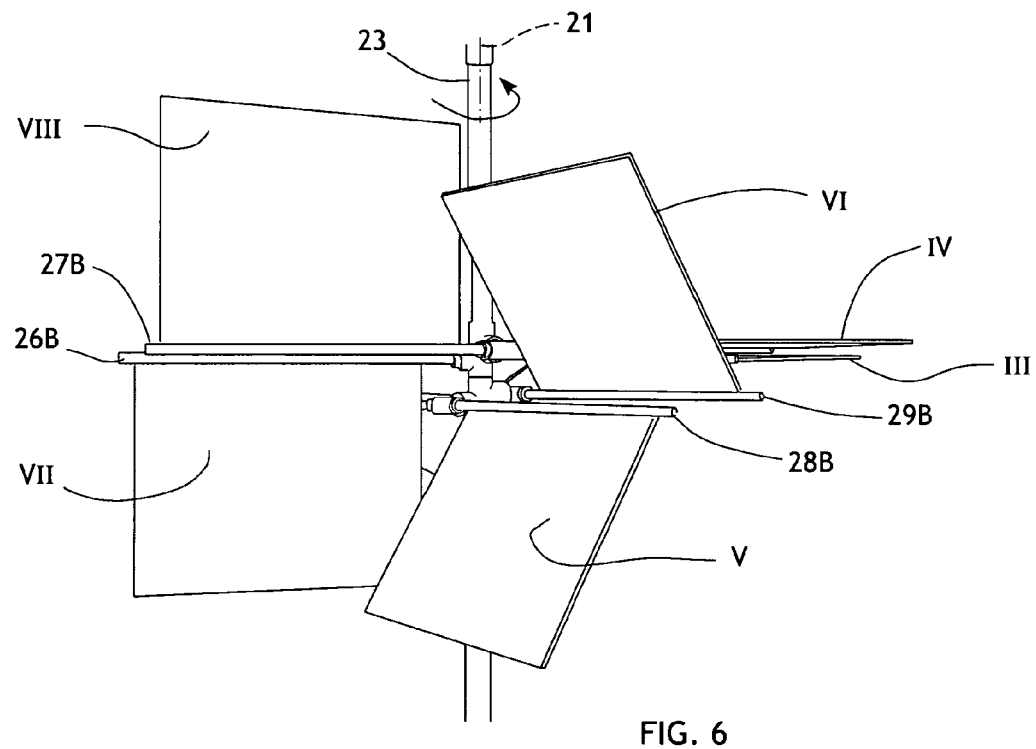
Figure 7:
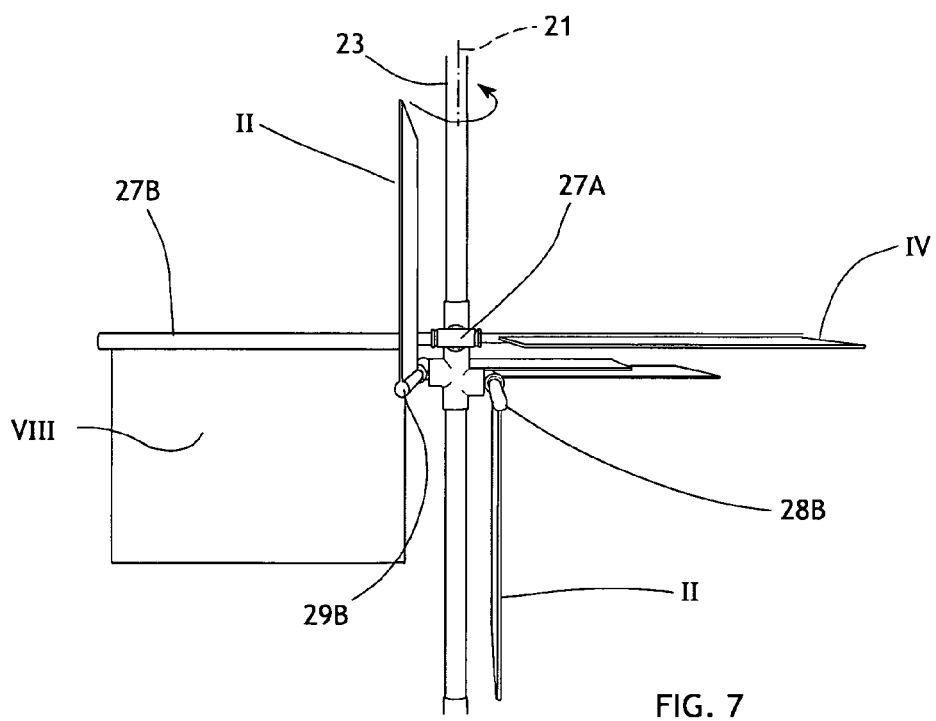

The pivot shafts 26B and 27B are similarly equipped with wings that have the same characteristics and relative orientations as described with respect to shafts 28B and 29B, as shown in FIGS. 6 and 7. Extending from opposed ends of shaft 26B are a pair of wings III and VII, and extending from opposed ends of shaft 27B are a pair of wings IV and VIII. Thus the wings are also paired in oppositional relationship: wings I and II, III and IV, V and VI, VII and VIII are disposed in vertically adjacent fashion. The combined effect of the eight wings and four pivot shafts is that every 90° incremental rotation of the central drive shaft 23 brings a new vertically paired set of opposed wings into the drive position. Likewise, these same vertically paired sets of wings move together to the glide position.

Figure 2:
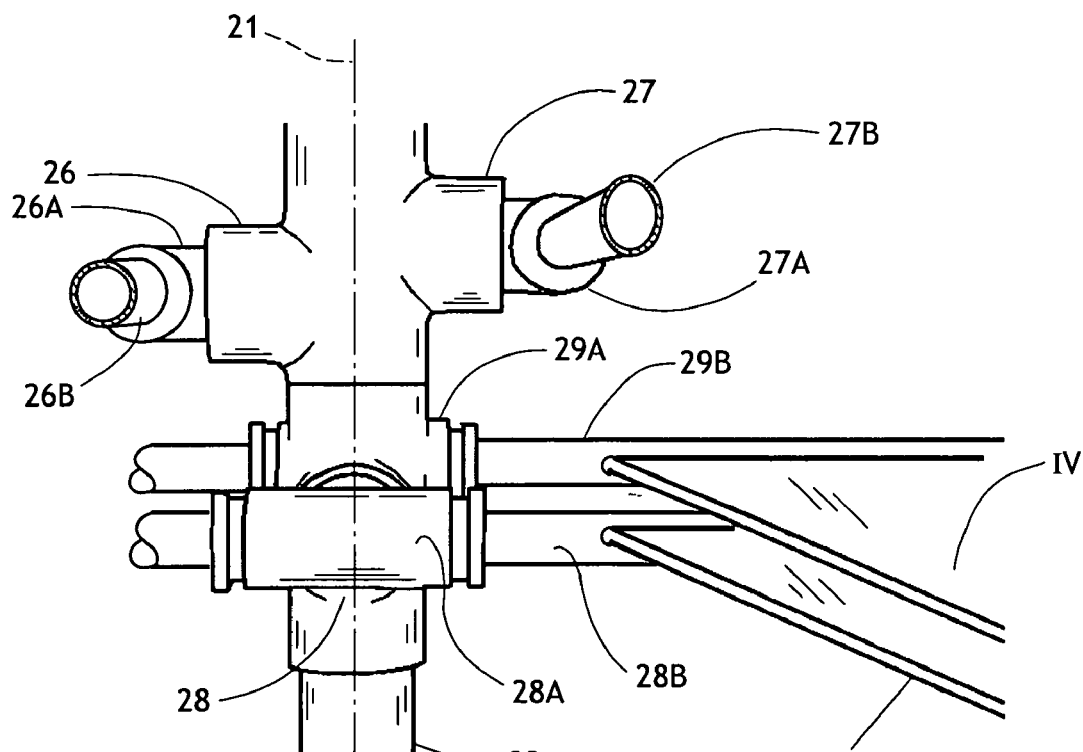
FIG. 2 is an enlarged fragmentary perspective view of the hub portion of FIG. 1, viewed from a different angle.

As shown particularly in FIGS. 2 and 6, the vertically paired wings in their glide positions are parallel and closely adjacent, extending perpendicular to the axis 21. These Figures illustrate the significant contribution of the vertical offset of shaft 26A from 27A, as well as shaft 28A from 29A: the vertical offsets prevent the vertically paired wings from colliding when they rotate into the glide position. This enables the feathered wing in the glide position to rotate to the zero degree angle, which accomplishes two things: the wings present a minimal air resistance at the glide position, and the zero degree dwell enables the other wing at the other end of the same pivot shaft to extend to a full 90° in the drive position, thereby maximizing its wind-catching ability. This innovation is an important aspect of the wind turbine of this invention.

Figure 10:
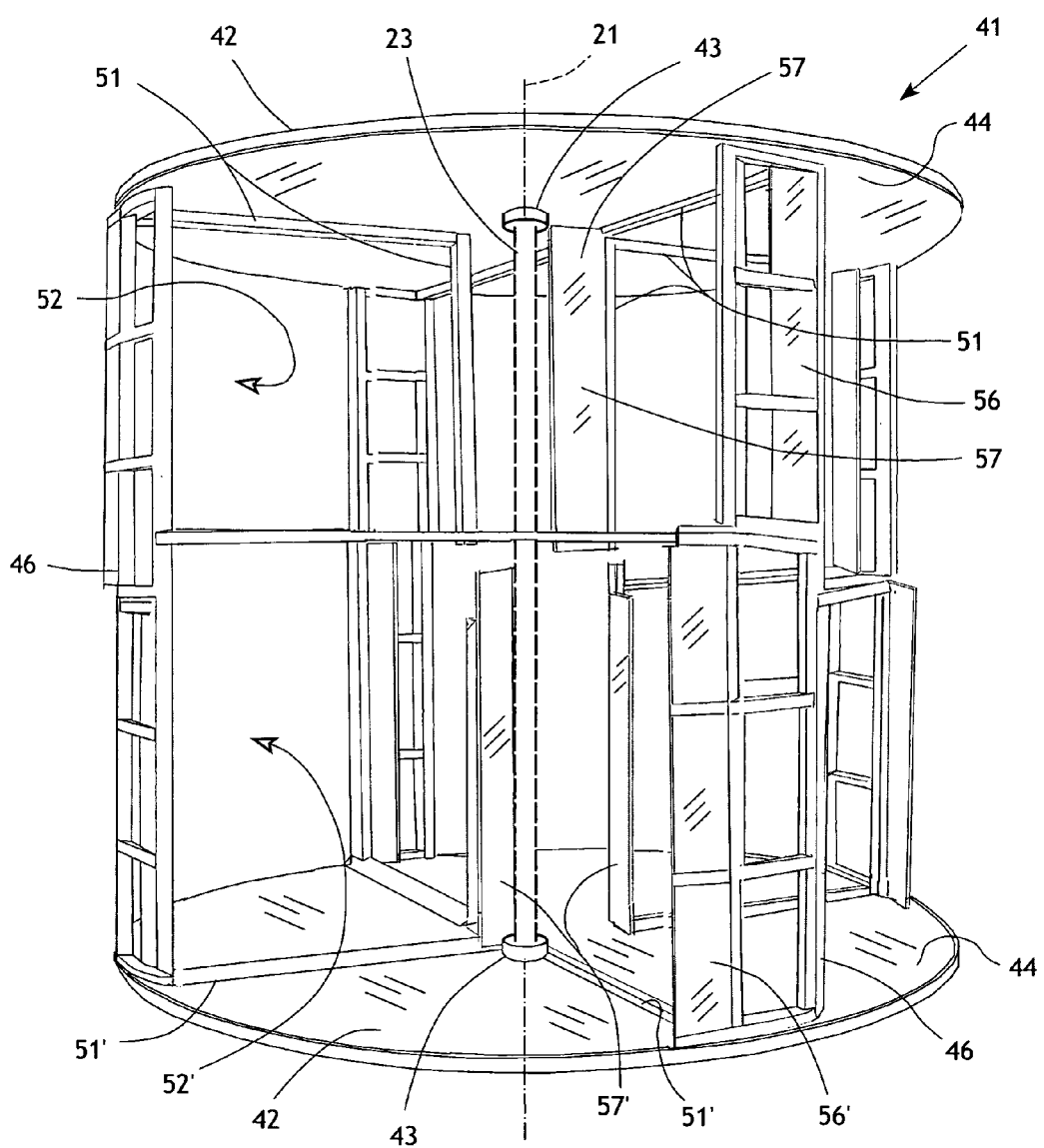
FIG. 10 is a perspective view of the components of the rotating turbine assembly with the pivot shafts and wings omitted to visualize the relationships of the components.

A further significant aspect of the invention is the provision of a support structure for the central drive shaft, the pivot shafts, and the wings. The turbine includes a rotating cylindrical outer frame assembly 41 extending coaxially about the central drive shaft 23, as shown in FIG. 10 (with the pivot shafts and wings removed to visualize the frame 41 components. The rotating cylindrical outer frame assembly 41 includes a pair of end assemblies 42 disposed in parallel, axially spaced relationship, each end assembly having a bushing 43 disposed to engage and secure the central drive shaft 23. In this embodiment the bushings 43 are secured to a pair of disk assemblies 44 that provide convenient mounting surfaces for many of the turbine components. The disk assemblies 44 are joined by an open frame construction to form a rigid structure.

With continued reference to FIG. 10, a major constituent of the rotating cylindrical outer frame assembly 41, as shown in FIGS. 8 and 9, is a quartet of box-like backstop assemblies 45, each located at the drive positions of two of the vertically paired wings. Each assembly includes a ladder-like frame 46 at the outer periphery of the structure 41, extending longitudinally between the two end assemblies 42. The like ends of two pivot shafts 47 and 48 (parallel and axially offset, as described above) extend radially outwardly from the central drive shaft, and are secured in bearings 49 and 50 supported in a medial portion of the frame 46. At the upper end of the assembly 45, a trio of framing strips 51 are secured to the frame 46 and end disk assembly 42 in a manner to define a rectangular perimeter in conjunction with the pivot shaft 47. This perimeter defines a rectangular opening 52 that is generally open for airflow therethrough. The perimeter defined by strips 51 is dimensioned to be slightly smaller than the respective wing 53 on the pivot shaft 47, whereby the framing strips 51 engage the three free edges of the wing 53 when it reaches its vertical drive position. Thus the strips 51 comprise a mechanical stop that absorbs the force of the wind on the wing and transfers the force through the structure 41 to the central drive shaft 23. In addition, the framing strips 51 are provided with cushioning strips 54 extending therealong to cushion impact and reduce noise output.

Joined to the frame 46 are fairing panels 56 and 57, each extending longitudinally and aligned with a respective side of the rectangular opening 52 and secured to the frame 46 and end disk assemblies 42. The fairing panels 56 and 57, together with the adjacent portion of the end disk assembly 42, form a rectangular, coffer-like wind trap. When the wing 53 reaches the drive position and impinges on the cushion strips 54, the entire rectangular opening 52 is closed and sealed by the wing, leaving no path therethrough for the airflow. The airflow would naturally tend to spread laterally and spill off the wing, but the presence of the fairing panels 56 and 57 and the end assemblies 42 prevents laminar flow off the wing and maintains the wind pressure for a longer time during the drive position part of the cycle. This effect increases the amount of energy harvested from the wind incident on the turbine.

Figure 3:
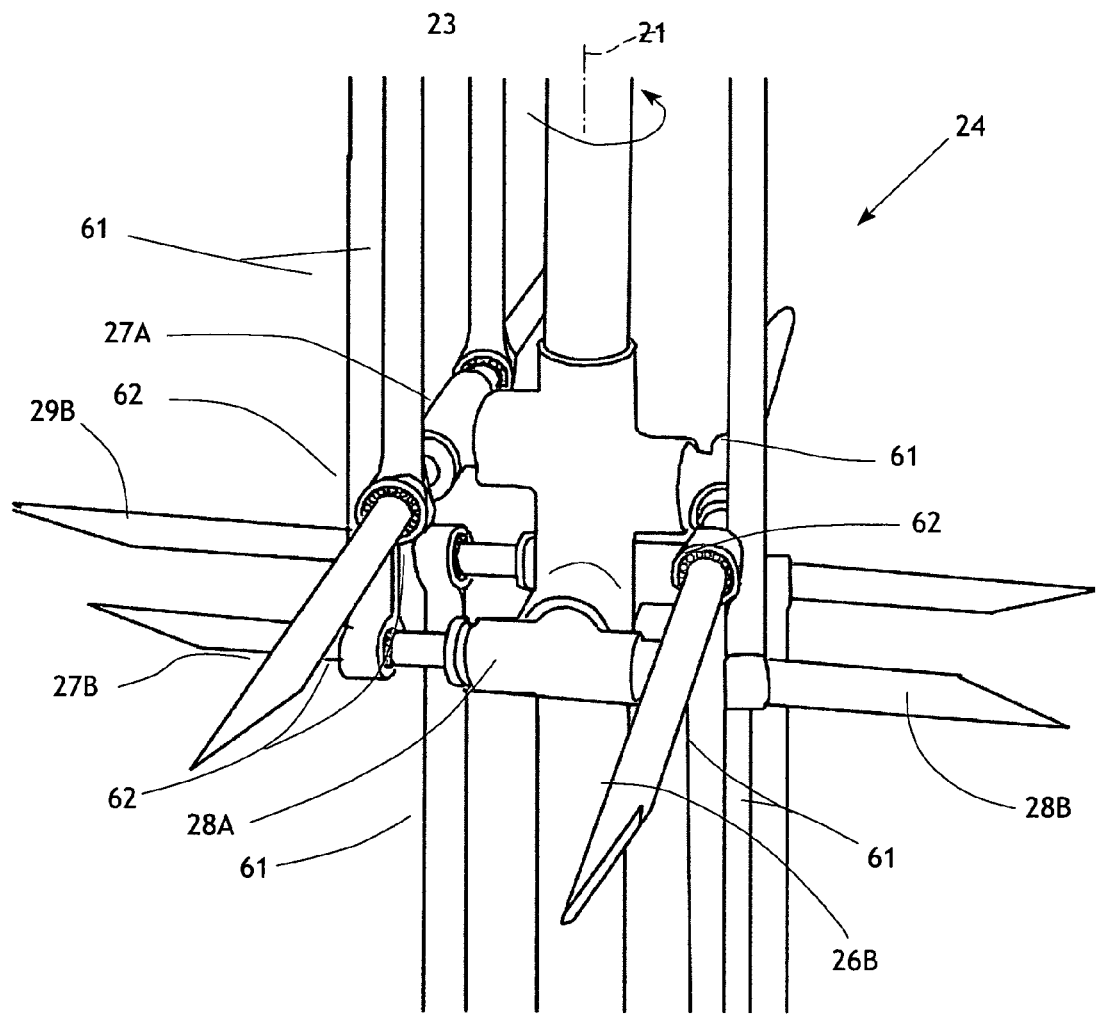
FIG. 3 is an enlarged fragmentary perspective view of the hub portion of FIGS. 1 and 2, including the supports on the pivot shafts that secure the backstop assemblies.

With regard to FIG. 3, the fairing panels 57 and their adjacent framing strips 51, which are disposed adjacent to the central drive shaft 23, may be supported along their longitudinal extents by a mechanical connection to the central drive shaft in the area of the hub 24. The hub 24 may be provided with projections or extensions (not shown) to support the longitudinal edge (the vertical edge in FIGS. 8-10) of the fairing panels 57 and by securing their framing strips to provide mechanical support. Alternatively, the framing strip 51 or 51' associated with each fairing panel 57 and 57' may be secured to a respective strut 61 extending from the end disk assembly 42 to a roller bearing housing 62 that rides on its respective pivot shaft (26B-29B). Each strut 61 provides mechanical support to the framing strip and thus the entire edge of its respective fairing panel, from the end assembly 42 to the respective pivot shaft.

At the lower end of the assembly 44 a trio of framing strips 51' are secured to the frame 46 and end assembly 42 in a manner to define a rectangular perimeter in conjunction with the pivot shaft 48. The construction of the lower end is the same as the upper end but inverted, and the similar components are given the same reference numeral with a prime (') designation. The similar components function as described above to achieve the same results.

Figure 26:
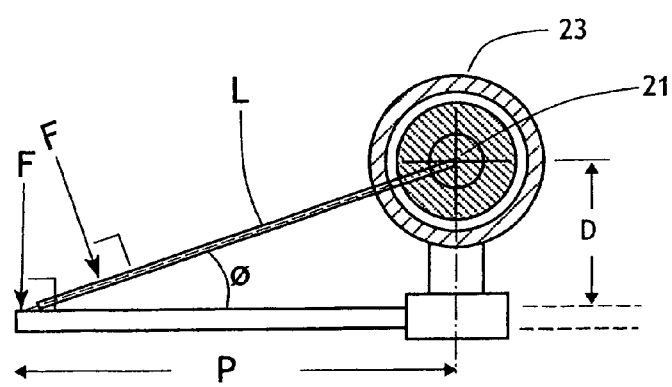
FIG. 26 is a diagrammatic view of the torque applied to the central drive shaft by the wings of the invention supported on their radially offset pivot axes.

Backstop assembly 44 also enables use of lightweight panels for all of the wings, since the wing is not required to transfer all the force it develops through its single-sided connection to the pivot shaft. Rather, the wing transfers the force all around the perimeter of the wing, particularly along the three free wing edges that impinge on the cushioning strips and framing strips of the backstop assembly 44. Thus the wing is relieved of the typical requirement to be sufficiently stiff and strong to transmit all the force it generates through its connection to the shaft of a mechanism, and the wings of this invention may be free of heavy structural reinforcement. As a result, the mass of the pivot shaft/wings assembly is minimal, and the mass of the entire rotating assembly in With regard to FIG. 26, the arrangement by which the pivot shafts are offset radially outwardly from the central pivot axis 21 provides an unforeseen benefit. Assuming a pivot shaft L that hypothetically extends directly from the central pivot axis 21, it will exert a torque equal to L·F. In this invention the pivot shaft P is offset radially outwardly from the axis 21 by a distance D. The angle θ between L and P is given by arctan D/P, and the torque T applied to the central shaft is $T=L/\cos\theta$. Given that the cosine function is always less than one, it is clear that the torque applied by the offset pivot shaft P is greater than the radially aligned shaft L, which is cumulative of the prior art arrangements. This torque advantage leads to greater efficiency of this turbine design compared to previous turbine constructions.

The backstops provide another contribution in that they receive the majority of the wind force from the wings in the drive position, and transfer that force to the outer cylindrical frame structure 41, thus unloading many potential stresses from the pivot shafts 26A-29A while creating the torque that drives the cylindrical outer frame 41 to rotate the central drive shaft 23.

Figure 11:
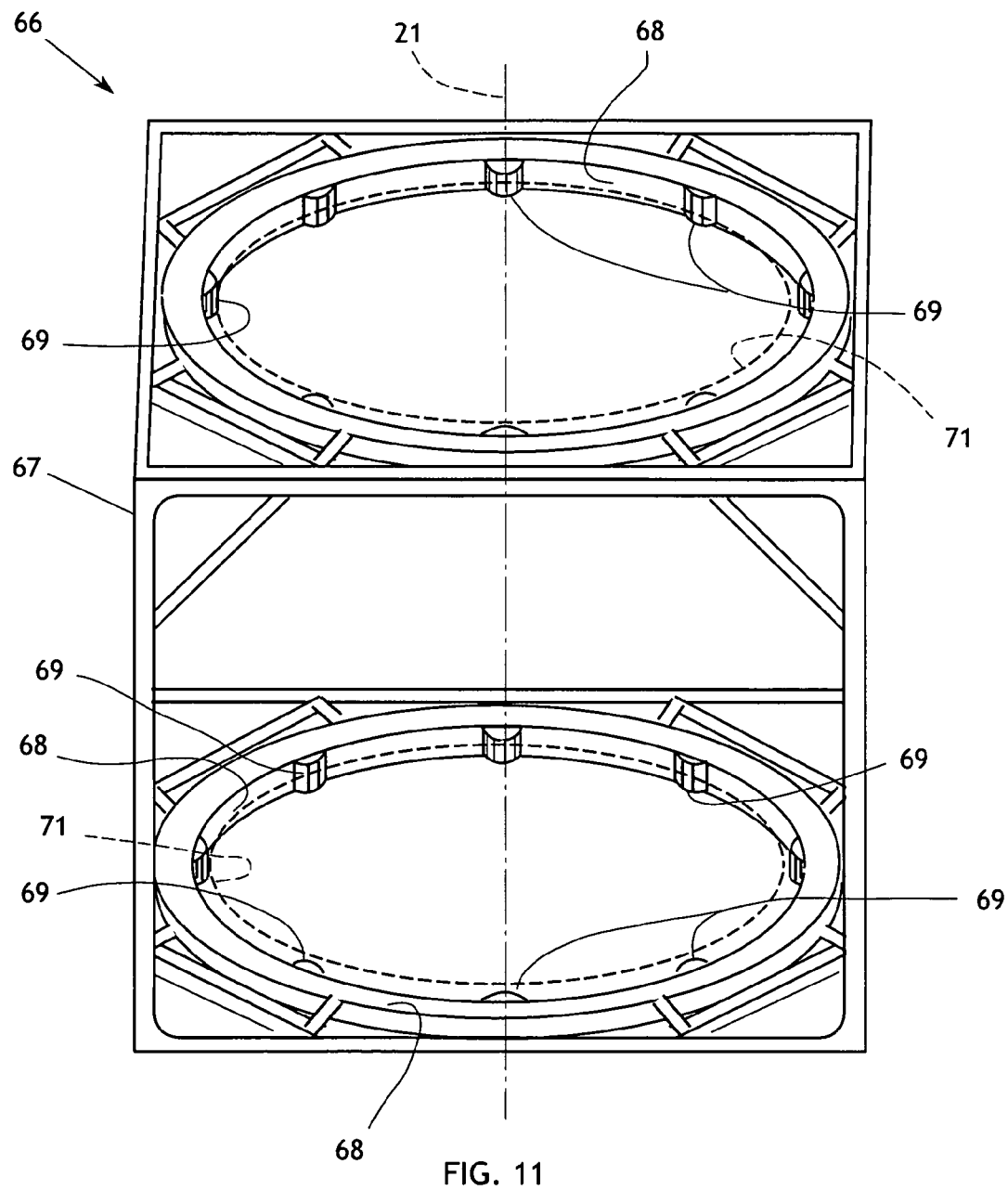
FIG. 11 is a top perspective of the outer support frame of the wind turbine of the invention.

Another key component of the wind turbine is a turbine housing 66, as shown in FIG. 11, which comprises an open frame structure 67 having a generally cubic form. (The open frame structure 67 may be clad or partially closed for structural purposes to direct fluid flow in an optimal manner.) The housing 66 is strong, stationary, stable, and designed to support the cylindrical outer frame assembly 41 that contains and supports the central drive shaft, the pivot shafts, the wings, and the backstop assemblies secured to the cylindrical frame structure 41. The top and bottom sides of the cube are provided with circular supports 68 that are aligned axially with the axis 21. A plurality of roller bearing assemblies 69 are secured in the supports 68 in an array that is symmetrical with the axis 21. Similar bearings are used to support the frame 21 in the axial direction. Moreover, the bearings define an interior opening (indicated by broken line 71) that is dimensioned to receive the perimeter of the end assembly 42 of the outer cylindrical frame 41. Indeed, the axial length of the open frame structure 67 is dimensioned so that each of the end assemblies 42 is received in a respective opening 71 in a rotatable, secure, supported manner. The bearing support of the end assemblies, in conjunction with the fact that all parts are dynamically balanced, allow high speed operation with little or no wobble, friction or vibration.

With reference to the serial perspective views of FIGS. 12-15, the central drive shaft 23 and the pivot shafts 26B-29B and their respectively mounted wings I-VIII, and the outer cylindrical frame assembly 41, together with its backstop assemblies 44, are joined together in a unified assembly and secured coaxially within the support housing 66 to comprise a complete wind turbine of this invention. The support housing 66 is secured to a mechanical ground, and the outer cylindrical frame assembly 41 rotates therein riding on the roller bearing assemblies 69. In these views the upper end assembly 42 comprises an open strut construction to replace the solid disk depicted previously, both to show an alternative structure and to enable better visualization of the interior components within the assembly.

Figure 12:
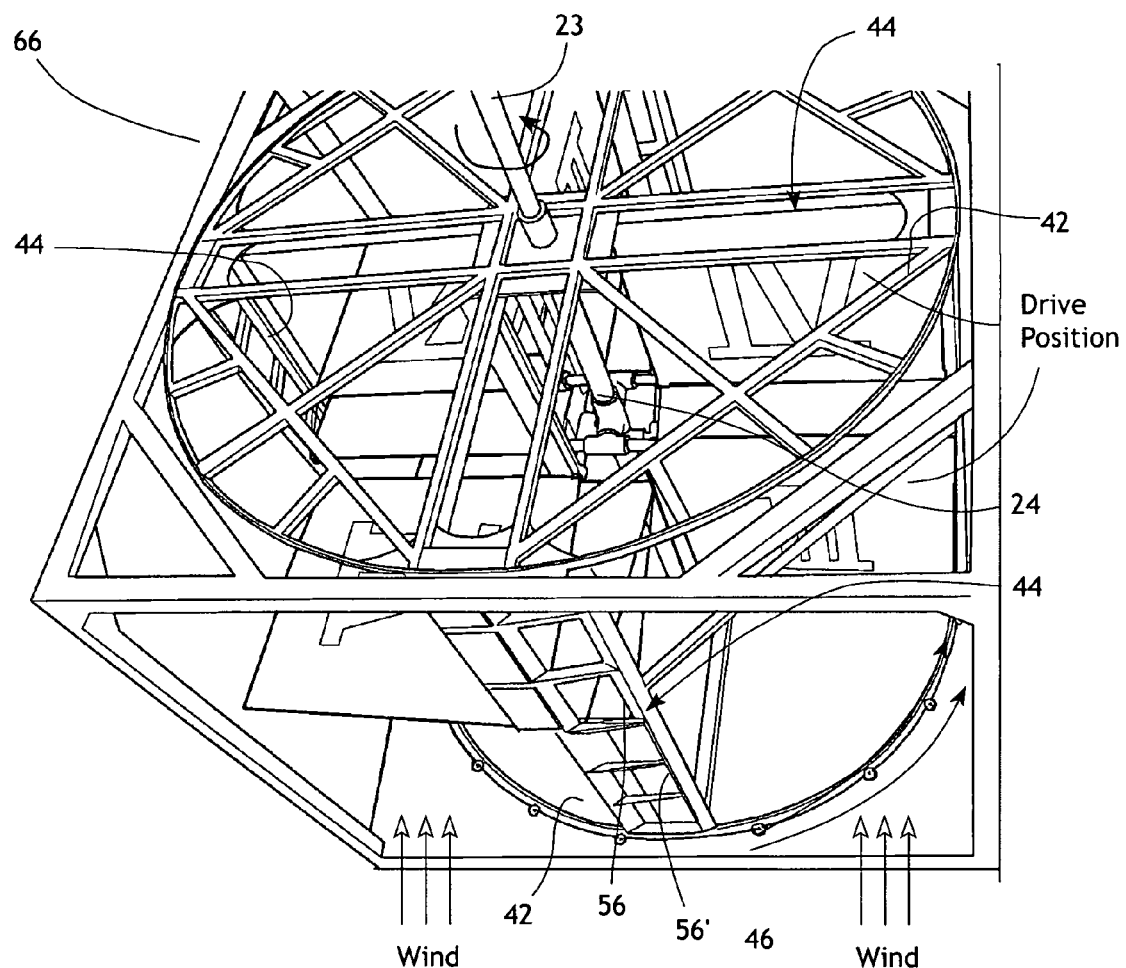
FIGS. 12-15 are a sequence of perspective views showing the incremental movements of the wind turbine components during a quarter cycle of turbine rotation.

In the view of FIG. 12, the wind is arriving from the bottom of the Figure, as labeled, and the outer cylindrical frame assembly 41 and the central drive shaft secured thereto are rotating counterclockwise (CCW). The drive position identified in FIGS. 4 and 5, for example, for each vertically paired set of wings, is determined by the wind direction and located at the 0°-90° quadrant of the rotating assembly 41 that recedes from the oncoming wind due to the rotational motion. Wings III and IV are in the drive position in their respective backstop assembly 44 as the assembly 41 has rotated to the angle at which the wings III and IV are completely transverse to the incident wind, and the backstop assemblies are generally aligned with the quadrants of the solid angle through which the assembly 41 rotates. This orientation guarantees that the wings VII and VIII at the opposed ends of their respective pivot shafts 28B and 29B are rotated completely into the glide position. At the same time the backstop assembly 44 is beginning to transition from the glide position, and the wings V and VI have arrived at the angle where they are poised to expand from their glide disposition.

Figure 13:
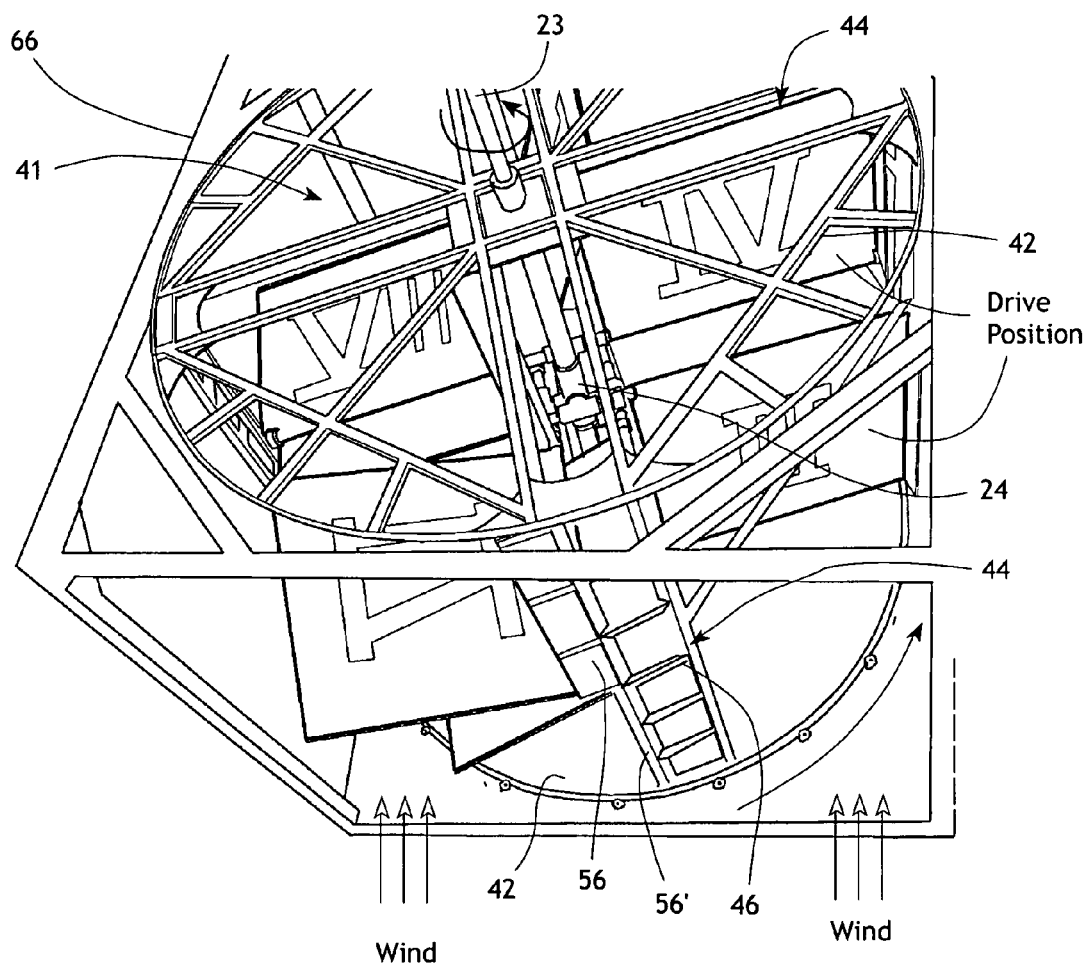

FIG. 13 depicts the same wind turbine as FIG. 12, with the rotating assembly advanced 15° in the rotational drive direction. The wings III and IV are still in the drive position, catching the full brunt of the wind force and pushing the wind turbine to rotate CCW. The wings V and VI are beginning to rotate and diverge from their glide positions, while at the same time their counterparts on the same pivot shafts, wings I and II are rotating out of their drive positions and beginning to move toward their glide positions. The oncoming wind force is caught by the diverging wings V and VI, urging the wings to open further and pushing the progress toward the full engagement of the drive position.

Figure 14:
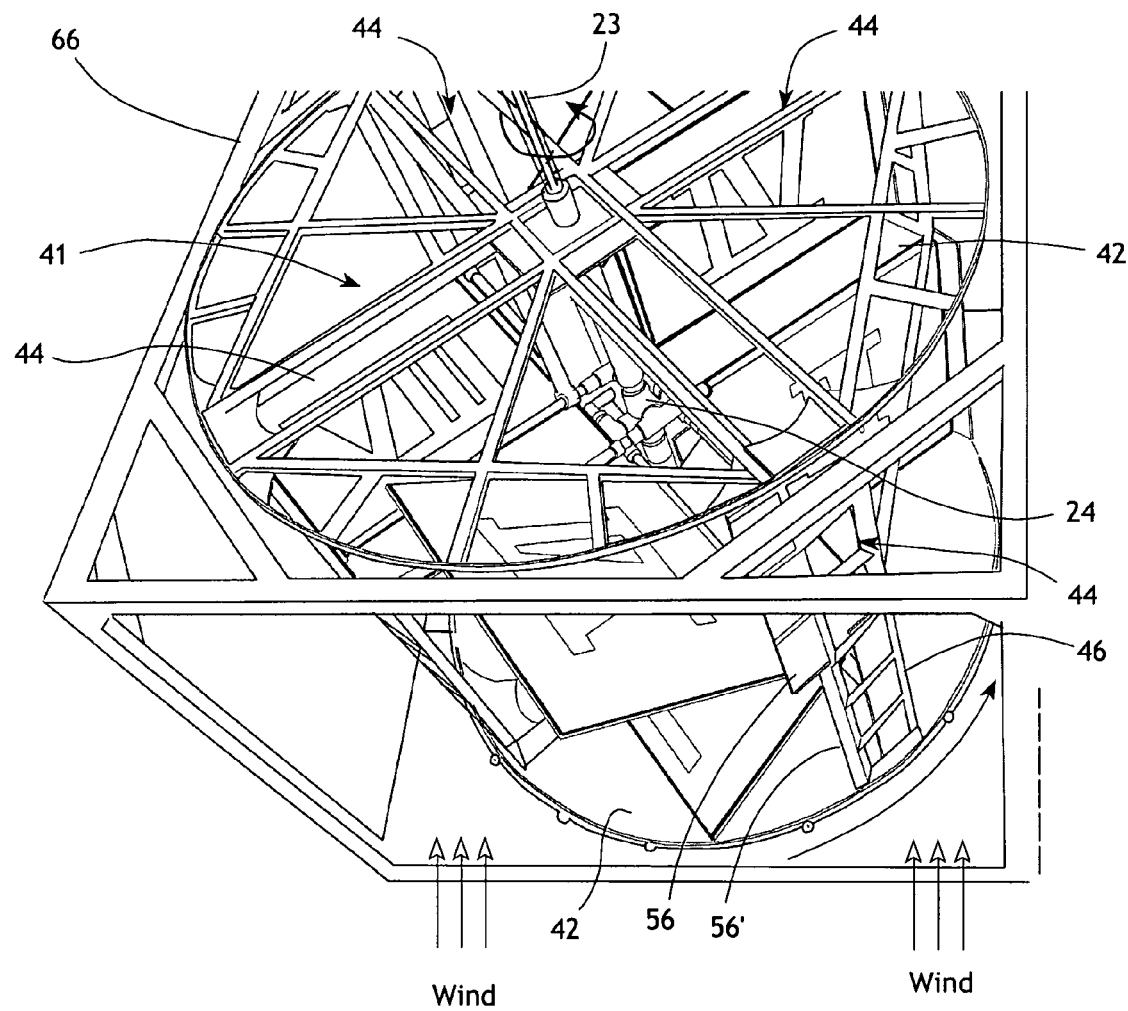

In the view of FIG. 14, the rotating assembly 41 of FIGS. 12-13 has turned a further 15° CCW from FIG. 13. The wings V and VI are opened about halfway from their glide position toward their drive position. The incident wind is not only forcing the wings V and VI to open further, it is deflecting off those wings and creating CCW torque on the rotating assembly 41. Thus the partially open wings are productive even before the drive position is attained. At the same time, the wings III and IV are beginning to rotate out of their drive positions and move toward their glide positions.

Figure 15:
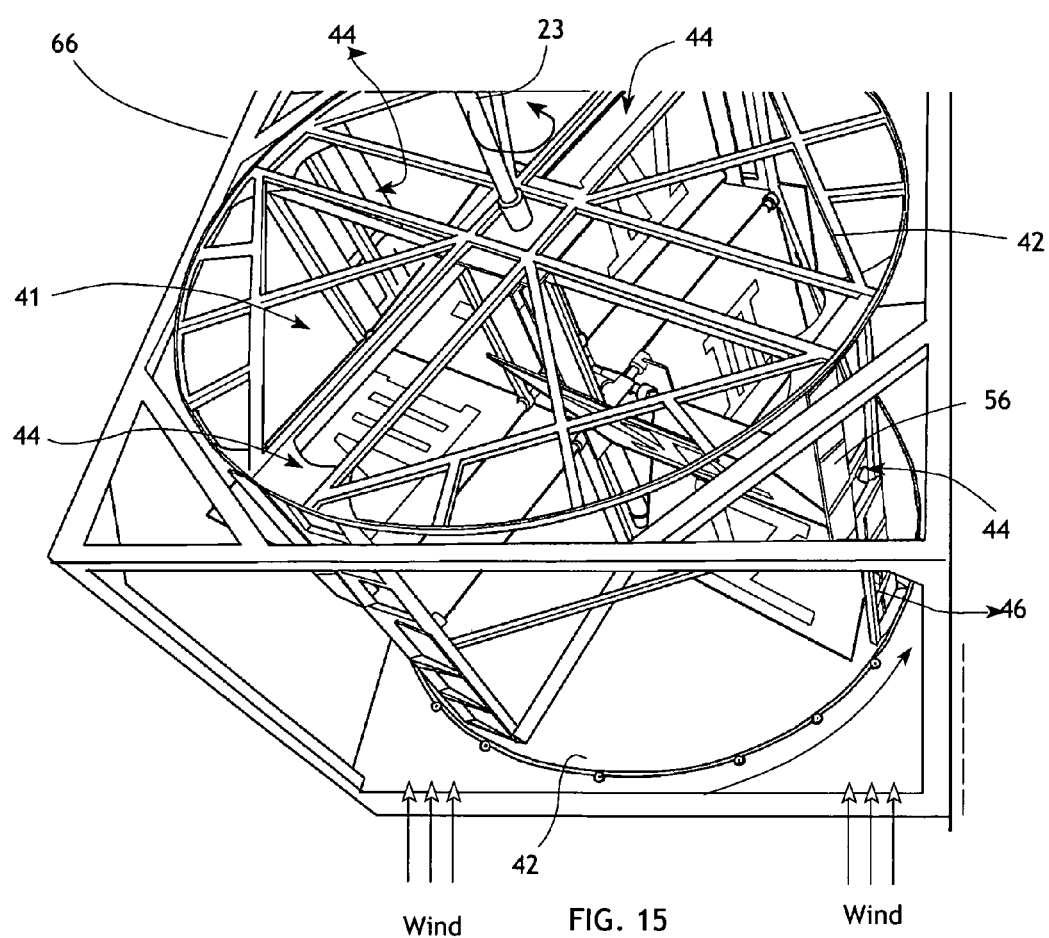

The cycle continues in FIG. 15, in which the assembly 41 has rotated a further 15° from the previous Figure. Wings V and VI are approaching full extension into the drive position and are catching a large fraction of the incident wind, which also determines that their counterparts on their pivot shafts, wings I and II, are approaching full rotation into the glide position. Wings III and IV are rotating further out of the drive position toward the glide position. In the next 15° incremental rotation, wings V and VI will be in the positions of wings III and IV shown in FIG. 12, and the process will begin to reiterate and continue indefinitely, as long as the wind is blowing at the wind turbine.

It should be noted that the paired parallel pivot shafts (26B with 27B, and 28B with 29B) rotate through a 90° angle in a reciprocal manner once each rotation of the rotating assembly 41. Moreover, each of the paired shafts is always rotating in a counter-direction to the other of the pair, so that their moments of rotation are substantially equal and opposite. This factor causes those moments of rotation to effectively cancel each other. In addition, any gyroscopic moments of precession of the pivot shafts are likewise canceled by the paired shafts, so that the cylindrical turbine assembly 41 is dynamically balanced in plural regards.

Thus the wind turbine of the invention may be placed in a wind stream from any direction, and it will begin to turn and establish a rotational velocity commensurate with the wind speed. And although the wind turbine has been described with its axis of rotation extending generally vertically in the Figures, it may be appreciated that the wind turbine may be disposed at any angular orientation, the only requirement being that the axis of rotation 21 is substantially transverse to the wind vector impinging on the turbine. The central drive shaft may be joined to the rotational input of any suitable apparatus or engine, such as an electrical generator, pump, compressor, or the like.

Although the single turbine is a self trimming viable working turbine unit, the fact that the drive position of the wind turbine is the locus of the wind force captured by the wings causes that force to be applied to the central drive shaft almost exclusively on an innate drive side that is diametrically opposed to the glide position of the wings of the wind turbine. This unbalanced force situation may present issues of wobble and wear of the bearings, and the like. Moreover, the inevitable frictional losses between the rotating wind turbine 41 and the bearings and frame create a residual torque applied to the frame 66 and its anchor or mechanical ground.

Figure 16:
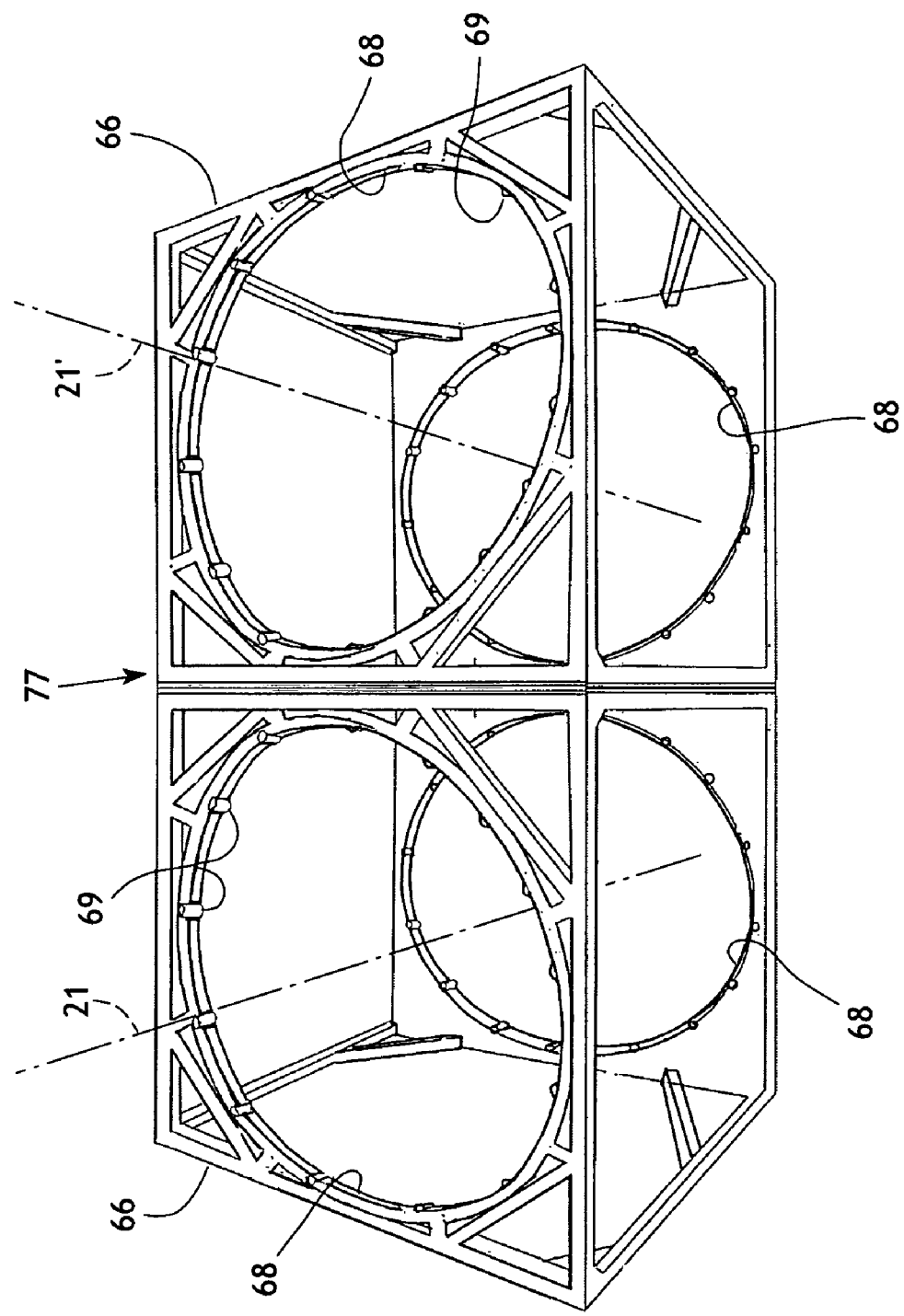
FIG. 16 is a perspective view of the support frame structure of the side-by-side twin turbine of the invention.
Figure 17:
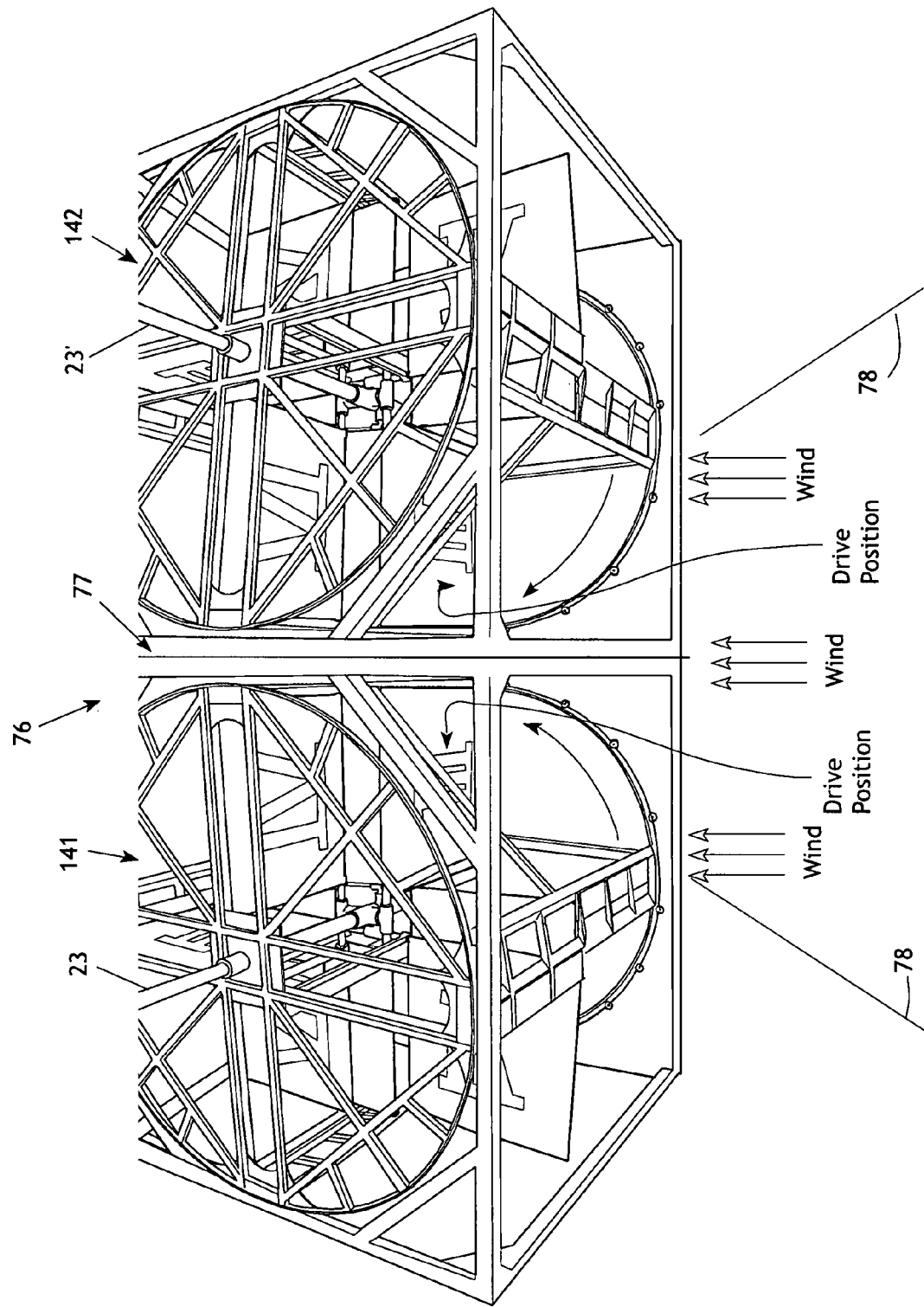
FIGS. 17 and 18 are a sequence of perspective views showing the incremental movements of the side-by-side twin turbine components during a partial cycle of turbine rotation.
Figure 18:
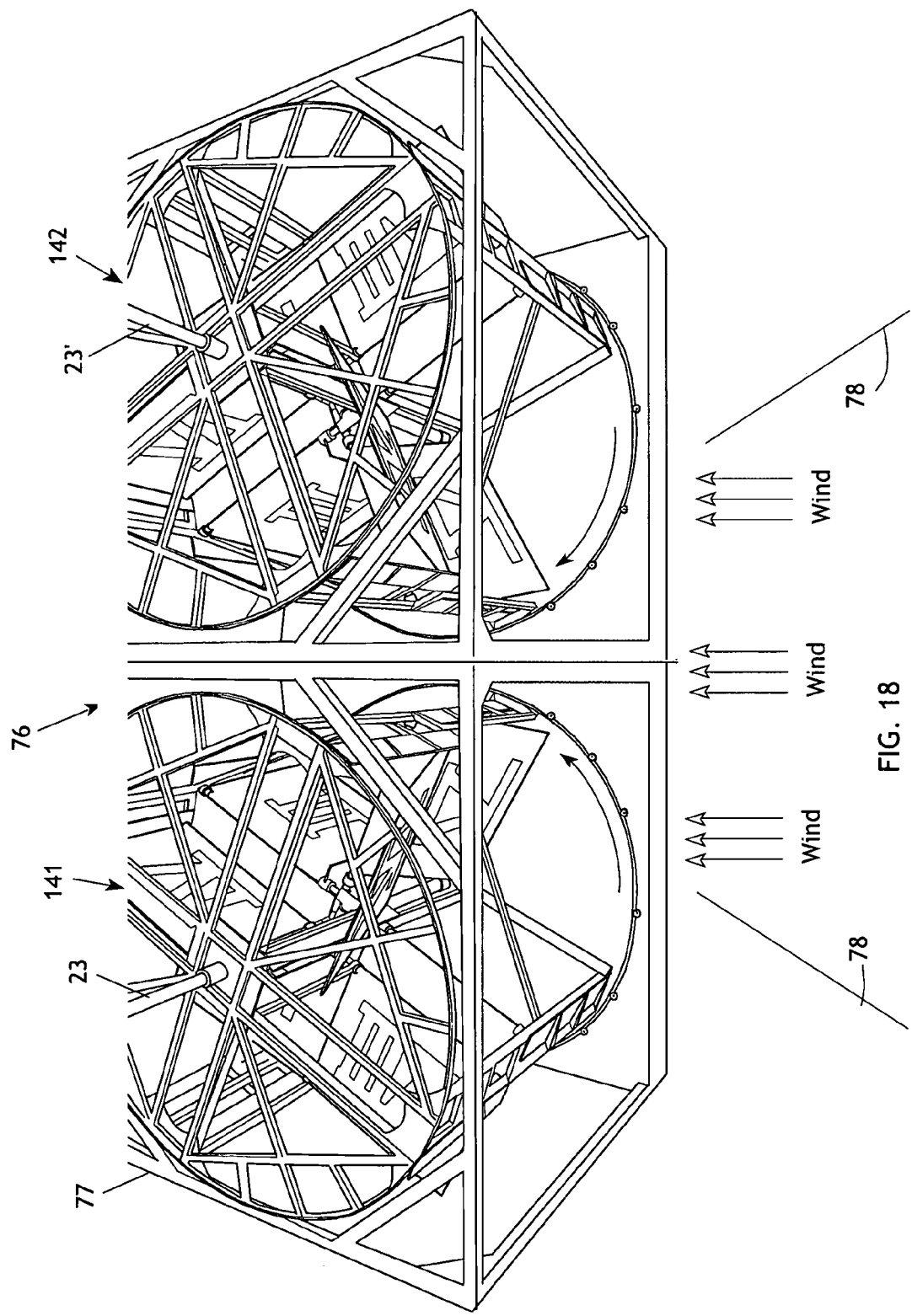

Thus a further aspect of the invention is a twin turbine assembly 76, as shown in FIGS. 16-18, in which the forces experienced by the wind turbines are balanced in mutual equilibrium. A key component of the twin turbine 76 is a twin turbine frame 77, as shown in isolation in FIG. 16. The frame 77 is essentially a pair of housings 66 as described previously, each comprised by an open frame having a rectangular or cubic shape, and supporting a pair of circular supports 68 with bearings 69 to support the end assemblies of a pair of rotating wind turbine assemblies 141 and 142, each supported in a respective opening in the housing 77 and aligned with axes 23 and 23', respectively. Note that the axes 21 and 21' of the two wind turbines are parallel and spaced as closely together as possible while avoiding interference of the wings of the adjacent wind turbines 141 and 142. A significant feature of this embodiment of the invention is that the two turbines are counter-rotating, as indicated by the motion arrows, so that the residual torque on the frame 76 is essentially equilibrated to zero.

To create a twin turbine, where one turbine is turning clockwise, and the other is turning counter-clockwise, it is not necessary to add or create any additional parts. Rather, in one of the turbines each of the backstop assemblies is merely changed to a position at the other side of the wings it has been engaged with, and the axle and wings are turned around (end for end). Thus setting the rotational direction is a trivial task that requires no new components. In this embodiment, one turbine functions in the exact opposite way as the other. Having all parts of both turbines mirror one another's movements creates a symphony of symmetry and balance. The twin turbine model not only eliminates the torque issue, but also dynamically balances each turbine relative to the other.

Furthermore, by rotating the turbines 141 and 142 in the opposite direction to one another, it is possible to locate the drive side (where the drive position of the wings is disposed) of each turbine adjacent to the other in the middle of their common frame structure 77, thus forming an intake area 78 confronting the incident wind that is double the size of a single turbine and thereby doubling energy production. The central drive shafts 23 and 23' may be connected to any rotational machine input through gears, pulleys, chain drives or any other mechanical expedient known in the art. This allows the turbines to remain synchronized and dynamically balanced each with the other.

With regard to FIG. 19, the twin turbine arrangement of FIGS. 16-18, hereinafter the side-by-side twin turbine 76, may be further enhanced by placing the entire assembly on a rotating support 81 that pivots freely about an axis 80 (the Z axis in FIG. 19). A tail assembly 82 extends from the turbine 76 in the leeward direction, and acts as a weather vane to rotate the support 81 and point the intake opening 78 of the turbine directly into the wind. Thus this apparatus will always track into the wind and generate the maximum amount of power even in changing wind conditions. Furthermore, if the ambient winds become too high and pose a threat to the wind turbine 76, the tail apparatus may be reefed and the support 81 rotated (manually or automatically) so that the intake opening is directed out of the wind and safe from storm winds and the like.

Figure 19:
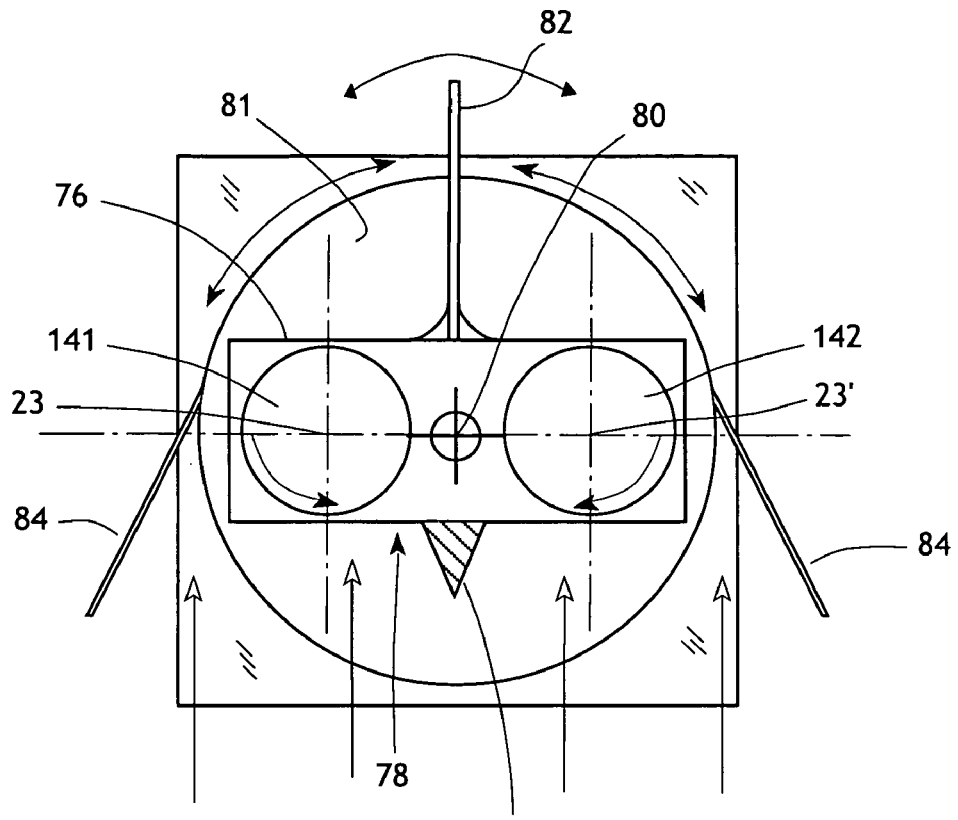
FIG. 19 is a plan view of a side-by-side twin turbine mounted on a turntable and adapted to point into the wind.
Figure 20:
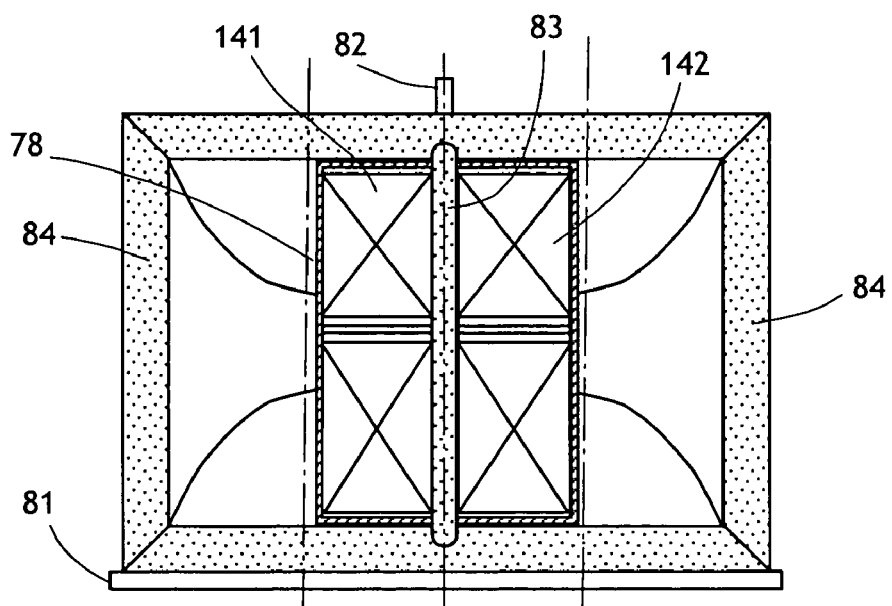
FIG. 20 is a plan front elevation of the side-by-side wind turbine with wind foils and nacelle to funnel the wind into the turbine.

As suggested in FIG. 19 and shown in FIG. 20, the wind-seeking apparatus of FIG. 19 may be provided with a wind foil 84 extending about the windward side of the assembly and tapered in funnel-like fashion to direct incident wind into the intake opening 78. In addition, a nacelle may extend across the opening 78 to split the incoming air stream into two columns that each impact one of the drive positions of the turbines 141 and 142. These features cause the wind to be concentrated at the intake opening 78 to maximize conversion of wind energy to useful work.

Figure 21:
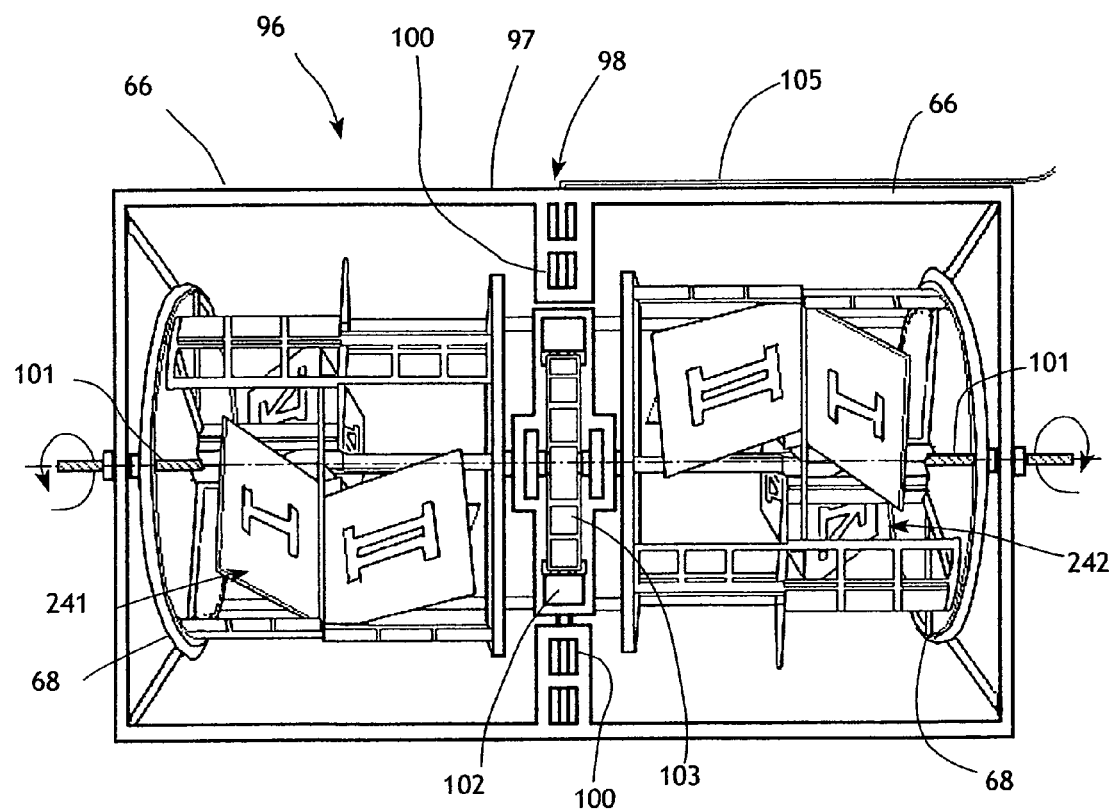
FIG. 21 is a cross-sectional plan view of the end-to-end wind turbine embodiment of the invention.

With regard to FIG. 21, a further aspect of the invention is the combination of a pair of wind turbines in a twin turbine end-to-end apparatus 96. A twin turbine frame 97 is comprised essentially of two housings 66 described previously and comprised by an open frame having a rectangular or cubic shape, and supporting a pair of circular supports 68 for a rotating turbine assembly 41. In the apparatus 96 the housings 66 are joined in axially aligned, end-abutting relationship, and two turbine assemblies 241 and 242 are supported in the housings 66 with their central drive shafts aligned. An axle 101 extends axially through the central bore of the tubular central drive shafts 23 of the two turbines, so that each may rotate independently while hewing to a common rotational axis.

Indeed, one of the turbines 241 or 242 is constructed to counter-rotate with the other of the pair, as explained in the previous side-by-side embodiment 76. This involves revers-ing the backstop assemblies and the pivot shafts so that the turbine turns in the opposite direction, as also described above.

An electrical generator 98 is supported by the frame 97 in a position intermediate the two turbines 241 and 242 and coaxial with those mechanisms. The central drive shaft of turbine 241 is connected to the field assembly 102 of the generator 98, while the counterpart of turbine 242 is connected to the central armature 103 of the same generator 98. The field unit and armature are counter-rotated by the two turbines 241 and 242 as they are turned by passing fluid flow, resulting in a net angular velocity that is twice that of a fixed-field generator. The electrical power thus generated may be picked up by electromagnetic coils 100 and fed through cables 105 extending along the frame 97 to a fixed anchor or similar support arrangement. Alternatively, the power may be picked up by slip rings or brushes or similar mechanisms known in the prior art, and connected to the cables 105.

The end-to-end turbine 96 lends itself well to use in generator sites where water flow is extensive, either through tidal flow, river currents, or wave action. With regard to FIG. 22, pair of stanchions 106 and 107 are anchored in the bottom of the lake, river, or bay, and each stanchion is provided with a vertical track. Lateral supports 108 extend between the stanchions and engage the tracks thereof, and are vertically movable by a motor drive system 109. Secured to the lateral supports 108 is a plurality of turbine assemblies 96, these turbines having been modified for operation in fresh or salt water. Each turbine includes a neutral buoyancy chamber 110 filled with ballast or air to establish a neutral buoyant condition for each turbine. The turbines extend coaxially, and are joined by universal joints 112 which couple the like-rotating ends of the end-to-end turbines, thereby doubling the torque applied to their generators. The universal joints 112 also act to prevent any residual torque along the turbine array.

Each turbine assembly 96 includes two counter-rotating turbines driven by the water flow between the stanchions created by natural forces, and the electricity thus generated is fed through a cable 111 to electricity consuming devices and customers. It may be appreciated that even if the water flow is reversed, as in tidal situations or wave action, the paired turbines will always counter-rotate in their same directions and the electricity generation will continue. Indeed, the turbine assemblies 96, whether used singly or as multiples in axial alignment, are completely self-trimming; that is, the drive position always moves angularly about the central axis so that the wings in their drive position confront the oncoming flow in fully transverse relationship to the flow. In addition, if water conditions (storm waves, tidal surges, and the like) threaten the generating facility, the motor drive system 109 may be activated to pull the wind turbines upwardly on the stanchion tracks and out of the water to avoid damage.

Figure 22:
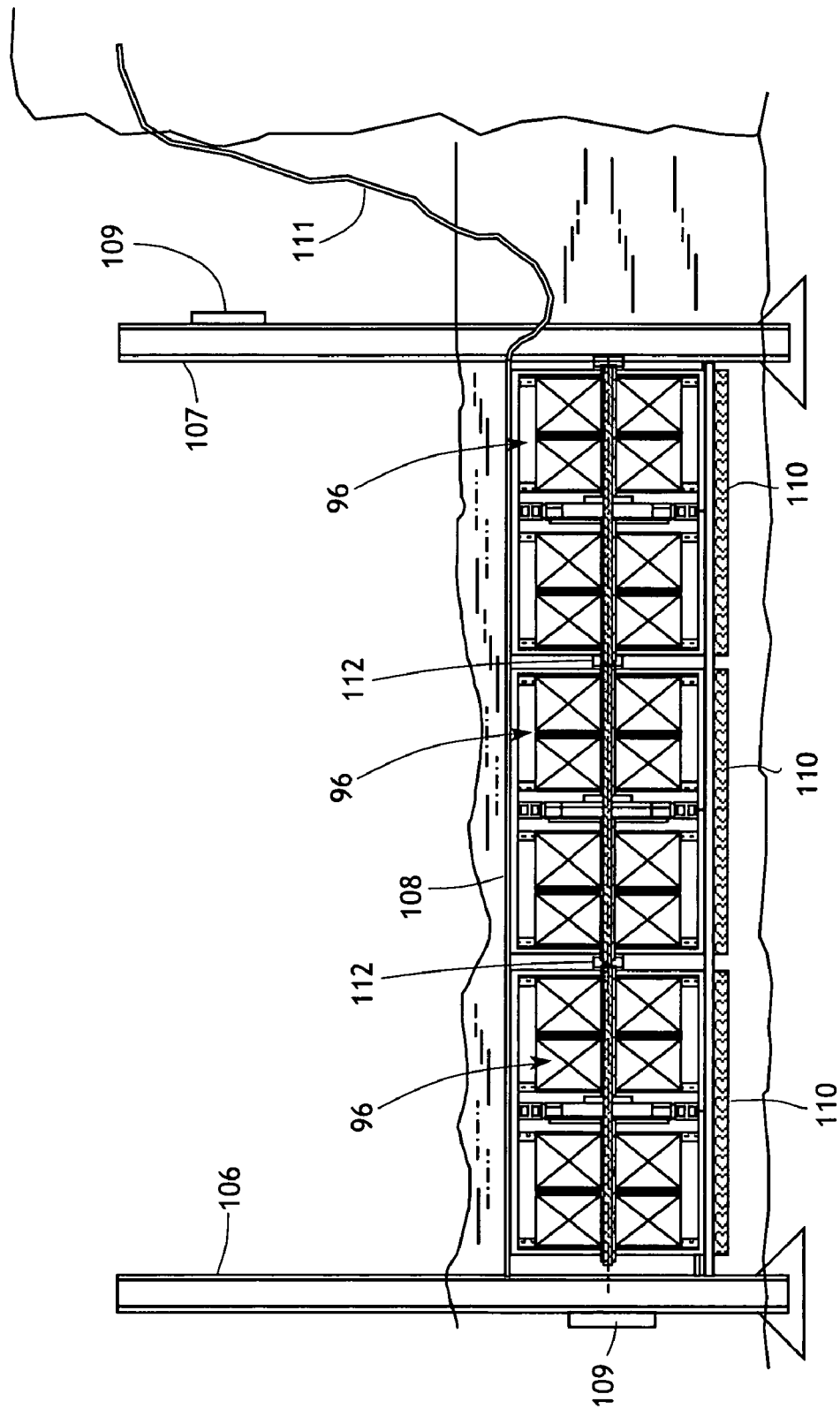
FIGS. 22 and 23 are plan elevations of two different embodiments for generating power using the turbines of the invention driven by flowing water.
Figure 23:
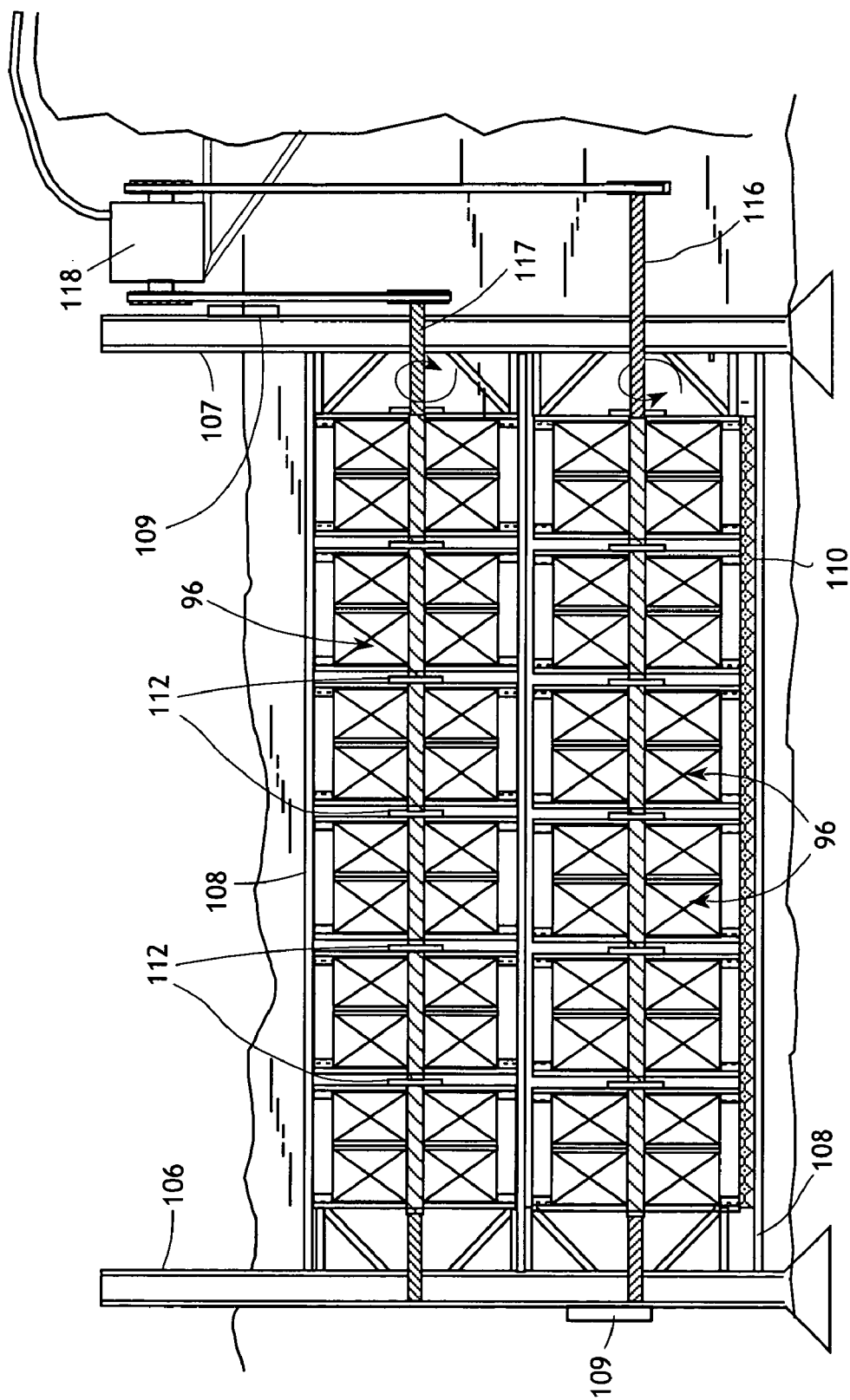

A further embodiment of the turbine 96 driven by flowing water is illustrated in FIG. 23, wherein components similar to those of FIG. 22 are given the same reference numerals. As in the previous embodiment, a pair of stanchions 106 and 107 are anchored in the floor of a body of water, and each stanchion is provided with a vertical track. Lateral supports 108 extend between the stanchions and engage the tracks thereof, and are vertically movable by a motor drive system 109. In this embodiment there are two axially aligned rows of turbine assemblies 96, these turbines likewise having been modified for operation in fresh or salt water. A neutral buoyancy chamber 110 filled with ballast or air to establish a neutral buoyant condition for the turbines is secured to the bottom of the assembly.

In each row, the turbines are set to rotate in the same angular direction, and are joined in series by intermediate universal joints 112 to add the torque along the turbine array. The output is coupled to upper shaft 116 and lower shaft 117, which are mechanically connected to a generator 118 by any suitable mechanical motion transmission. Here the generator 118 is supported above the waterline for easier connections and maintenance. The two shafts 116 and 117 counter-rotate, and are connected to opposed ends of the generator 118, whereby the field assembly and armature of the generator are likewise turned in counter-rotation to double the angular velocity and increase the voltage and power output of the generator. As in the previous embodiment, the drive side of each turbine 96 will change if the water current direction between the stanchions reverses, but the pairings of counter-rotating turbines in both cases enables the water current generator arrangement to continue to operate without requiring any changes to the devices. As before, if storms or wind create hazardous conditions, the system 109 may be activated to raise the entire turbine assembly on the stanchion tracks out of the water to avoid damage.

In both the embodiments of FIGS. 22 and 23, the lateral supports 108 may comprise tubular struts or pipes, or may comprise high strength wire rope or cable spanning the stanchions and maintained under high tension by a standard turnbuckle arrangement or hydraulic or pneumatic actuators. Indeed, a high tension wire rope or cable may be passed through the aligned tubular central drive shafts of the turbines 96 to align and support them directly on their axes. Four or more high tension cables may be extended in a similar manner between the stanchions to pass through the four interior vertices of the frame structures 66 (and optionally other parts as well) to anchor the devices. This arrangement has the advantage of easy assembly and disassembly for maintenance purposes. Also, the neutral buoyancy afforded by chamber(s) 110 in both embodiments serve to minimize the suspended weight and reduce undesirable loading on the cables. In addition, in both embodiments the number of turbines turning in one angular direction is matched by an equal number turning in the opposite direction, so that the net torque on the assembly is zero.

Figure 24:
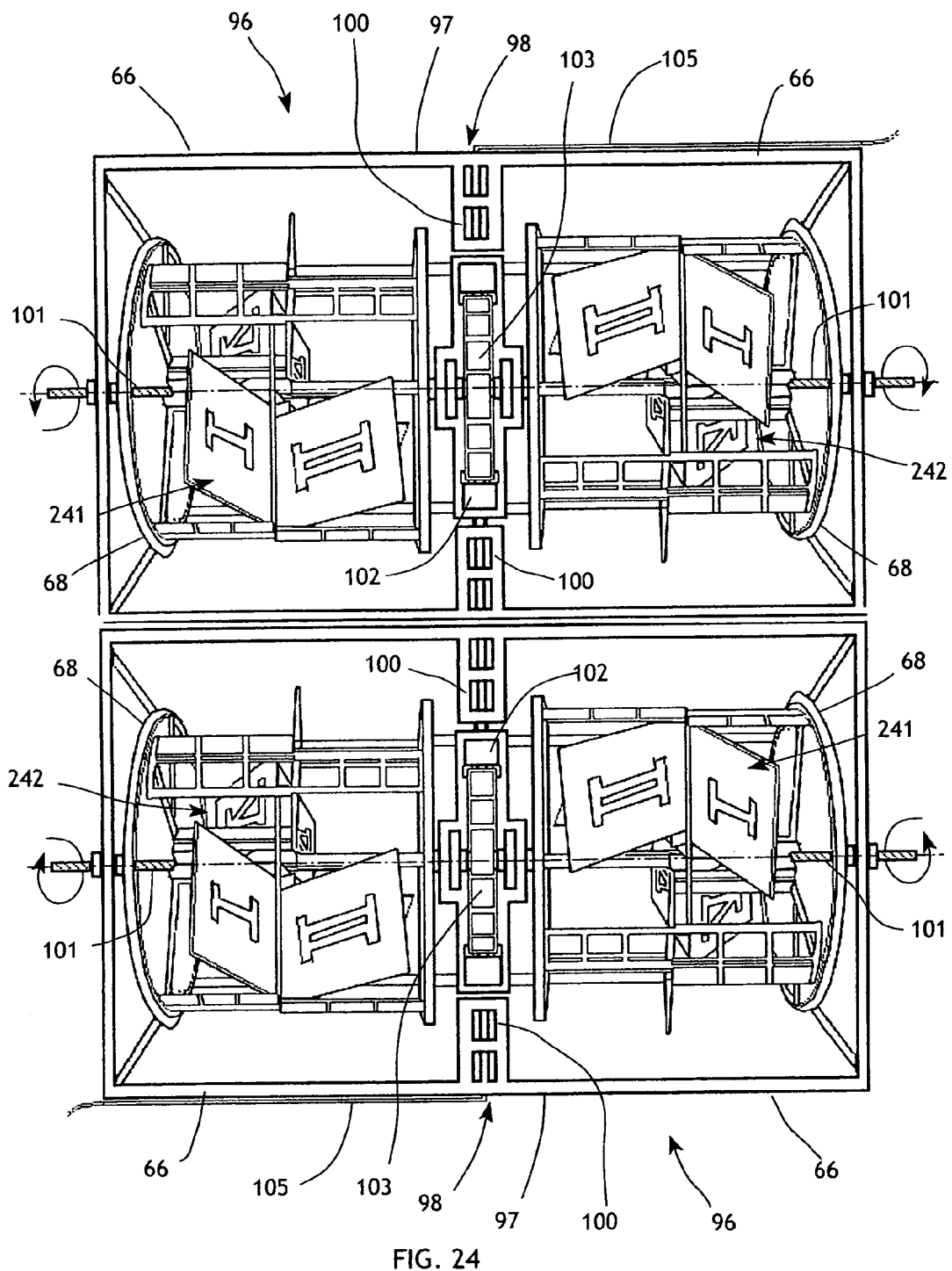
FIG. 24 is a perspective elevation of a twin side-by-side turbine apparatus for generating electrical power.

With regard to FIG. 24, the twin turbine concept may be extended by providing two twin turbines in an array that combines the best of the end-to-end and side-to-side embodiments illustrated above. Two end to end models 96 are joined in a four turbine array by linking their outer frames 66 in adjacent, impinging relationship. In this arrangement the counter-balancing torque feature of the side-by-side turbines turning in opposite directions on the two parallel main shafts, and also the end to end turning in opposite directions sharing the same shaft with two generators 98 sandwiched in between doubling the generators' angular velocity.

In general, the turbine construction of this invention exhibits several advantages over other wind turbines. One of the major disadvantages of traditional propeller-type turbines is that these machines cost millions of dollars and, because of their large diameters, they require tall pylons and must be anchored in concrete deep in the ground. Thus they are fixed installations and cannot function during windless days or seasons. In contrast, a wind turbine according to this invention that generates a comparable energy output could be made to be transportable anywhere that the wind happens to be blowing. A turbine may be transported on a truck, either sized to the truck, or much larger than the truck, broken down into smaller component parts, making them transportable on the highway and easily reconstructed. Instead of an investment of millions of dollars staying idle during windless periods, these machines may be moved on the truck bed throughout the year to locations where the wind is blowing, optimizing the return on investment with high yearly energy yields. Unlike traditional propeller turbines, these compact units extract a high percentage of the available energy relative to their operating space. They are slow-moving with extremely high torque.

Figure 25:
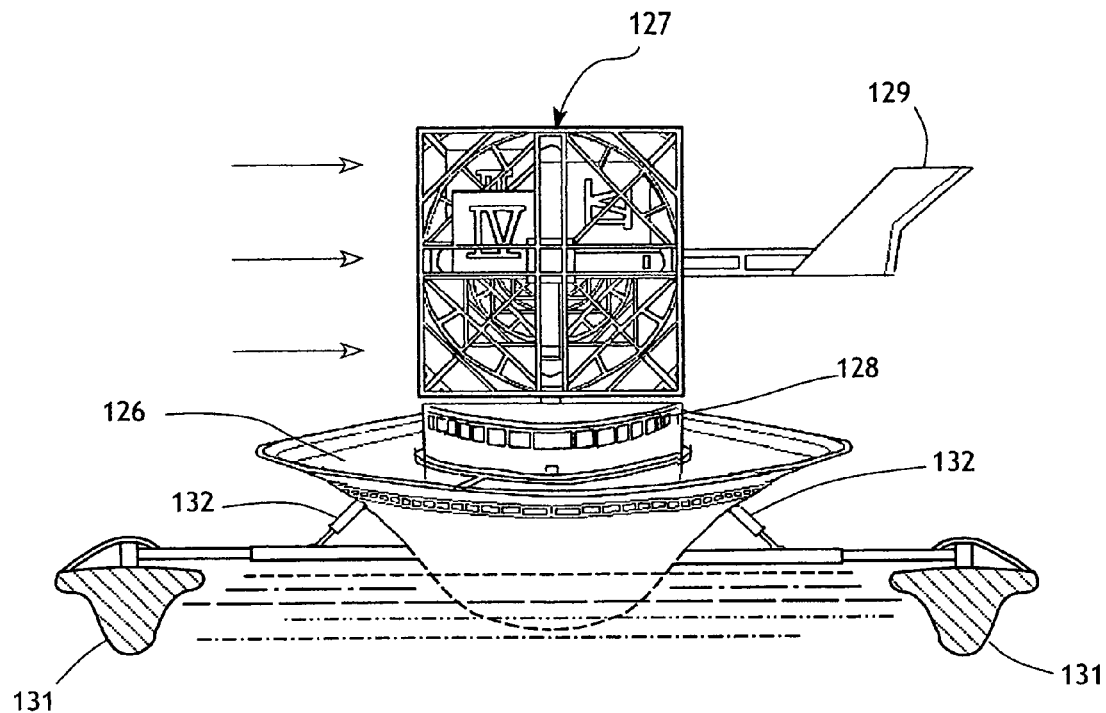
FIG. 25 is a front elevation of a boat propulsion system using the turbines of the present invention.

This turbine can also be used as a propulsion system for a ship. With reference to FIG. 25, instead of a sail this ship 126 deploys an array 127 of end-to-end and/or side-by-side twin turbines to generate power for forward movement. The turbine array 127 has its main axis extending horizontally and is mounted above deck on a rotatable support 128, with a tail 129 acting as a weather vane to keep the array pointed into the wind for maximum power generation. Thus, electrical power generated by the wind turbine array 127 described herein may be delivered to an electrical propulsion system for the ship, enabling the ship to go in any direction desired, regardless of the direction of the incident wind. If the wind turbines comprise a large mass and wind load above the waterline, the ship may be provided with pontoons 131 extending to port and starboard that may be retracted out of the water or extended outward and downward on hydraulic arms 132 to keep the ship from listing from one side or the other when the wind is blowing from either beam direction.

Figure 27:
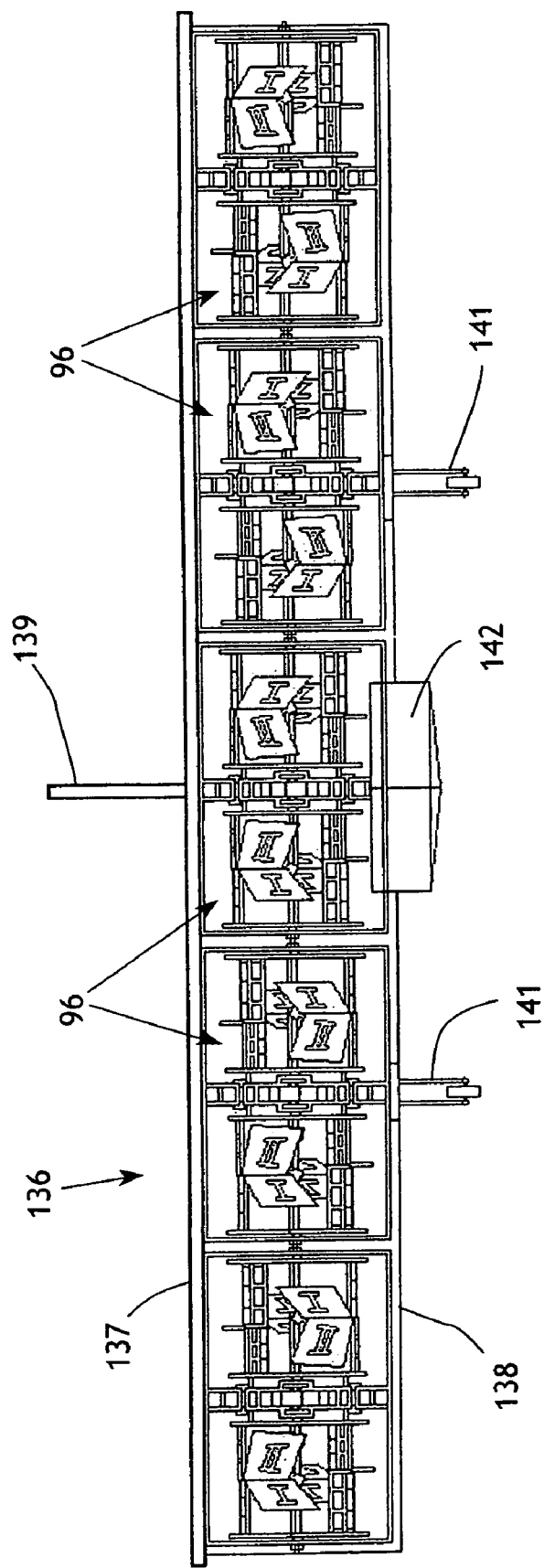
FIG. 27 is a front elevation of an airplane propulsion system using the turbines of the present invention.

The wind turbine of the invention may also comprise a direct propulsion source by driving the central drive shaft to rotate, causing the wings to cycle as described above, and in doing so to expel air from the turbine and generate thrust. For example, with regard to FIG. 27, a further use of the turbine described herein is to propel a high altitude biplane 136. The aircraft 136 includes upper and lower wings 137 and 138, vertical stabilizer tail 139, landing gear 141, and a cargo hold 142. An end-to-end array of turbines 96, as described in FIG. 21, are arrayed between the wings and extending substantially the length thereof. The top surface of wing 137 supports a large array of photovoltaic cells, and the power they generate is applied to the generators 98 of the units 96 to drive them as motors and cause the turbines to rotate. The thrust thus generated propels the aircraft 136. It is believed that this turbine array can maintain traction in the thin upper atmosphere better than propeller arrangements, and that the turbines can thus power the aircraft to higher altitudes than can any propeller. Note that the twin turbines are counter-rotating, so that there is no net torque applied to the aircraft, which would otherwise cause the aircraft to pitch up or down.

The wind turbine of the invention is also very scalable from very large installations to very small ones. For example, a collection of miniature turbines can be arranged on a line in a series stretched across a stream for manageable, portable, do-it-yourself, domestic or recreational power generation. Or the turbines can be as large or larger than a ten story building. Since these turbines operate closer to the ground than traditional propeller models that tower in the air, they have a lower visual impact on the skyline. Furthermore, the relatively slow moving turbines of the invention may pose less of a danger to birds as, even without their intake wind foils in place, the glide side is always open, and the drive and transition sides always appear to be obstructed.

A salient feature of the construction of this wind turbine is that all moving parts, because they have equal and opposite counterparts moving in the opposite direction at all times, are vertically and diagonally balanced. Returning to FIGS. 4-7, note that diagonally, wing I is balanced with VI, II is diagonally balanced with V, III with VIII, and IV is diagonally balanced with VII as they are numbered on these illustrations. Obviously, looking vertically, both wings I+II, III+W, V+VI and VII+VIII are balanced.

It may be noted that the wings are of different lengths at axially opposed ends of the wind turbine. This is because the axle housings on the hub are longitudinally offset as described above. Regardless of the different wing size this difference is also symmetrical and dynamically counterbalanced by virtue of this design. The shorter wings on the upper pivot shaft 27B with wings IV and VIII going up are shorter than wings on axles 28B and 29B because they are closer to the upper covered rim but are the same size as wings I and VI that go down on the lowest mounted axle, which are closer to the bottom covered rim of the turbine. These two axles with their same sized wings stay dynamically balanced because each wing is diagonally and vertically opposite in position, size and movement direction to the other. The same relationship applies to pivot shafts even though their wings, being the same size, are slightly longer than the wings of pivot shafts 26B and 27B.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. A turbine assembly for converting fluid flow into rotational movement for useful work, including:
   a central drive shaft assembly rotatable about a central axis;
   a plurality of pivot shafts, each extending transversely to said central axis and supported on said central drive shaft assembly by bearing means, each of said pivot shafts having a respective pivot axis extending longitudinally therethrough;
   a plurality of wings secured to said pivot shafts, said plurality of wings comprising a pair of wings secured to opposed ends of each of said pivot shafts, each pair of wings extending in planes that pass through the respective pivot axis and diverge 90° from each other about the respective pivot axis;
   said plurality of pivot shafts comprising paired pivot shafts extending in parallel relationship and spaced in diametrical opposition with respect to said central axis, said paired pivot shafts having opposed end portions that are parallel and closely adjacent, two of said wings extending from said adjacent end portions and defining an opposed pair of wings;
   said paired pivot shafts being rotatable about their respective pivot axes from a drive position in which said opposed pair of wings extend generally parallel to said central axis and transverse to incident fluid flow to maximally impinge on said fluid flow, to a glide position in which said opposed pair of wings extend generally transverse to said central axis and parallel to incident fluid flow to minimize drag.

2. The turbine assembly of claim 1, wherein said pair of wings extending from each of said pivot shafts are arranged so that when one of said pair of wings is in said drive position the other of said wings is disposed in said glide position, and said pivot shaft rotates reciprocally through a 90° angle.

3. The turbine assembly of claim 1, further including a plurality of backstop assemblies joined to said central drive shaft assembly, each backstop assembly disposed at said drive position to engage and support said opposed pair of wings at said drive position.

4. The turbine assembly of claim 3, wherein each of said backstop assemblies includes an opening having a perimeter that is complementary to the outer edge configurations of said opposed pair of wings, said outer edge configurations impinging on said perimeter and transferring force therethrough to said central drive shaft assembly when said opposed pair of wings is in said drive position, thereby driving said central drive shaft assembly to rotate.

5. The turbine assembly of claim 4, wherein each of said perimeters includes cushioning material to absorb impact and decrease noise.

6. The turbine assembly of claim 5, further including a pair of fairing panels extending along opposed side portions of said perimeter adjacent to each of said opposed pair of wings, said pair of fairing panels increasing fluid flow loading on said opposed pair of wings.

7. The turbine assembly of claim 3, further including an outer cylindrical frame structure joined concentrically to said central drive shaft assembly, said outer cylindrical frame structure including a pair of end disk assemblies extending parallel and spaced apart along said central axis, said backstop assemblies secured between said end disk assemblies.

8. The turbine assembly of claim 7, further including a plurality of support struts extending between said end disk assemblies.

9. The turbine assembly of claim 8, wherein said backstop assemblies each have an outer side adjacent to the circumference of said outer cylindrical frame structure and secured to one of said support struts, and an inner side adjacent to said central drive shaft assembly and secured thereto.

10. The turbine assembly of claim 1, wherein said paired pivot shafts comprise first and second pairs of pivot shafts, said first pair of pivot shafts being offset slightly in the direction of said central axis, said second pair of pivot shafts extending 90° from said first pair of pivot shafts and being offset in the direction of said central axis.

11. The turbine assembly of claim 7, wherein said outer cylindrical frame structure supports bearing means for rotatably securing the distal ends of said plurality of pivot shafts.

12. A multiple turbine assembly for converting fluid flow into rotational movement for useful work, including:
   a pair of wind turbines, each having an outer cylindrical frame structure that rotates on a respective longitudinal axis and is secured concentrically to a central drive shaft assembly, each wind turbine having two pairs of pivot shafts extending transversely to said longitudinal axis and secured to its respective central drive shaft assembly, each of said pairs of pivot shafts extending in parallel and being disposed in diametrical opposition with respect to said central drive shaft assembly and offset in the direction of the longitudinal axis;
   four pairs of wings, each pair secured to opposed ends of one of said pivot shafts, each pair of wings extending in planes that pass through the respective pivot shaft axis and diverge 90° from each other about the respective pivot shaft axis;
   each of said paired pivot shafts having opposed end portions that are parallel and closely adjacent to the end portions of the other, two of said wings extending from said adjacent end portions and defining an opposed pair of wings;
   said paired pivot shafts being rotatable about their respective pivot axes from a drive position in which said opposed pair of wings extend generally parallel to said central axis and transverse to incident fluid flow to maximally impinge on said fluid flow, to a glide position in which said opposed pair of wings extend generally transverse to said central axis and parallel to incident fluid flow to minimize drag;

a twin turbine frame structure for supporting each of said pair of turbines in freely rotating fashion about their respective longitudinal axes, said pair of turbines being disposed in said twin turbine frame structure in closely adjacent fashion.

13. The multiple turbine assembly of claim 12, wherein said pair of turbines are disposed in said twin turbine frame structure in side-by-side fashion with the longitudinal axes of said pair of turbines in parallel, spaced apart relationship.

14. The multiple turbine assembly of claim 13, wherein one of said pair of turbines is constructed to counter-rotate with respect to the other of said pair of turbines, and the drive positions of said pair of turbines are thereby disposed in closely adjacent fashion to define an intake opening for the twin turbine assembly.

15. The multiple turbine assembly of claim 14, further including airfoil surfaces disposed about said intake opening to funnel said flowing fluid into said intake opening.

16. The multiple turbine assembly of claim 14, further including a rotating base for supporting said twin turbine frame structure, and a tail assembly secured to said twin turbine frame structure and oriented to point said intake opening into any fluid flow incident on the twin turbine assembly.

17. The multiple turbine assembly of claim 12, wherein said pair of turbines are disposed in said twin turbine frame structure in end-to-end fashion with the longitudinal axes of said pair of turbines in axial alignment.

18. The multiple turbine assembly of claim 17, wherein one of said pair of turbines is constructed to counter-rotate with respect to the other of said pair of turbines.

19. The multiple turbine assembly of claim 18, further including an electrical generator assembly coupled between said pair of turbines in coaxial relationship therewith, said electrical generator assembly having a field assembly connected to the rotational output of one of said pair of turbines and an armature assembly connected to the rotational output of the other of said pair of turbines, said armature and field assemblies thereby being driven to counter-rotate and double their respective angular velocity.

20. The multiple turbine assembly of claim 19, further including a plurality of said twin turbine frame structures, each supporting a pair of said turbines and said electrical generator assembly coupled therebetween, said twin turbine frame structures extending between two anchors in a body of water, and means for connecting the output of said electrical generator assembly to do useful work.

21. The multiple turbine assembly of claim 17, further including a plurality of said twin turbine frame structures, each supporting a pair of said turbines, said plurality of twin turbine frame structures extending in axial alignment with an axle extending through the central drive shaft assemblies of all of the turbines of said plurality of twin turbine frame structures, and means for connecting said axle to do useful work.

22. The multiple turbine assembly of claim 16, wherein said rotating base is mounted on a watercraft in an above-deck position and connected to generate electrical power for propulsion of the watercraft.

23. The multiple turbine assembly of claim 22, wherein said plurality of twin turbines is supported on an aircraft and disposed to generate forward thrust by rotation of said plurality of twin turbines.

24. The multiple turbine assembly of claim 23, wherein said aircraft is a biplane, and said plurality of twin turbines is disposed in a position intermediate of the two wings of the biplane.

\* \* \* \* \*